(12) United States Patent
Zhang et al.

(10) Patent No.: US 11,459,830 B2
(45) Date of Patent: Oct. 4, 2022

(54) DEVICES AND SYSTEMS FOR USING ADDITIVE MANUFACTURING TO MANUFACTURE A TOOL CROWN

(71) Applicant: Smith International, Inc., Houston, TX (US)

(72) Inventors: Youhe Zhang, Spring, TX (US); Xiaoge Gan, Houston, TX (US); Huimin Song, Spring, TX (US); Rogelio Benitez, Spring, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 341 days.

(21) Appl. No.: 15/685,351

(22) Filed: Aug. 24, 2017

(65) Prior Publication Data

US 2018/0058148 A1   Mar. 1, 2018

Related U.S. Application Data

(60) Provisional application No. 62/380,972, filed on Aug. 29, 2016, provisional application No. 62/380,994, filed on Aug. 29, 2016.

(51) Int. Cl.
*E21B 10/55* (2006.01)
*E21B 10/42* (2006.01)
(Continued)

(52) U.S. Cl.
CPC .............. *E21B 10/55* (2013.01); *E21B 10/42* (2013.01); *E21B 10/62* (2013.01); *B22F 2005/001* (2013.01)

(58) Field of Classification Search
CPC .......... E21B 10/55; E21B 10/42; E21B 10/62; E21B 17/04; E21B 17/046; C22C 29/08; C22C 26/00
(Continued)

(56) References Cited

U.S. PATENT DOCUMENTS 1,995,043 A * 3/1935 Sanderson .............. E21B 17/04
   175/413
3,726,351 A * 4/1973 Williams, Jr. .......... E21B 10/54
   175/426
(Continued)

FOREIGN PATENT DOCUMENTS

CN   102272407 A   12/2011
CN   105649538 A    6/2016

OTHER PUBLICATIONS

Office Action issued in Chinese Patent Application No. 2017107509393, dated Dec. 23, 2020, 9 pages (15 pages with translation).
(Continued)

*Primary Examiner* — D. Andrews

(57) ABSTRACT

A tool includes a base with a crown extending from the base. The crown is additively manufactured on the base, forming a bond between the crown and the base. At least one protrusion may extend from the base surface into a recess in the crown, such that the crown encompasses the protrusion. The protrusion may mechanically interlock the base and the crown to improve torque transfer between the crown and base. The bond at the contact between the base and crown may include impregnating at least a portion of the crown with the material of the base, or at least a portion of base with the material of the crown, which may improve a connection between the crown and base.

11 Claims, 19 Drawing Sheets

(51) Int. Cl.
*E21B 10/62* (2006.01)
*B22F 5/00* (2006.01)
(58) Field of Classification Search
USPC .......................................................... 419/18
See application file for complete search history.

(56) References Cited

U.S. PATENT DOCUMENTS

| | | | |
|---|---|---|---|
| 6,338,390 B1* | 1/2002 | Tibbitts | E21B 7/24 |
| | | | 175/381 |
| 7,389,833 B2* | 6/2008 | Walker | E21B 10/36 |
| | | | 175/382 |
| 7,419,017 B2* | 9/2008 | Walker | E21B 10/62 |
| | | | 175/413 |
| 8,807,242 B2 | 8/2014 | Cheng | |
| 2009/0020339 A1* | 1/2009 | Sherwood, Jr. | E21B 10/633 |
| | | | 175/426 |
| 2009/0301787 A1* | 12/2009 | Smith | E21B 10/42 |
| | | | 175/327 |
| 2010/0187018 A1* | 7/2010 | Choe | C22C 14/00 |
| | | | 175/426 |
| 2010/0192475 A1* | 8/2010 | Stevens | C22C 1/1036 |
| | | | 51/309 |
| 2010/0193255 A1* | 8/2010 | Stevens | B22F 3/26 |
| | | | 175/435 |
| 2011/0174546 A1* | 7/2011 | Bell | E21B 10/02 |
| | | | 175/246 |
| 2011/0266068 A1* | 11/2011 | Eason | B22D 19/14 |
| | | | 175/374 |
| 2011/0303465 A1* | 12/2011 | Rupp | E21B 10/48 |
| | | | 175/403 |
| 2012/0312598 A1* | 12/2012 | Cheng | G01K 11/24 |
| | | | 175/50 |
| 2013/0118730 A1* | 5/2013 | DiFoggio | B22F 5/10 |
| | | | 166/244.1 |
| 2015/0159440 A1* | 6/2015 | Garner | E21B 10/43 |
| | | | 175/428 |

OTHER PUBLICATIONS

Office Action in Chinese Patent Application No. 2017107509393, dated Jan. 6, 2022, 14 pages.
Zhaodong, "Mechanical Maintenance Metallurgy", Tianjin Science and Technology Press, first edition, Feb. 1986; pp. 124-128.
Tiejun, "Patent Analysis Report of Additive Manufacturing Industry", Intellectual Property Publishing House, first edition, May 2014, pp. 7-8.
Chinese Office Action in Chinese Patent Application No. 2017107509393, dated Mar. 30, 2022.

* cited by examiner

DEVICES AND SYSTEMS FOR USING ADDITIVE MANUFACTURING TO MANUFACTURE A TOOL CROWN

CROSS-REFERENCE TO RELATED APPLICATIONS

This application claims the benefit of, and priority to, U.S. Patent Application No. 62/380,972 filed Aug. 29, 2016 and to U.S. Patent Application No. 62/380,994, filed Aug. 29, 2016, which applications are incorporated herein by this reference in their entireties.

BACKGROUND

In underground drilling, a drill bit is used to drill a borehole into subterranean formations. The drill bit may be part of a bottom hole assembly (BHA) that may include sensors, batteries, telemetry devices, reamers, and other equipment located near the drill bit. The BHA is attached to a drill string made of sections of pipe that extend to the surface. A drilling fluid, or "mud", is pumped from the surface to the drill bit through the drill string. The primary functions of the mud are to cool the drill bit and carry drill cuttings away from the bottom of the borehole and up through the annulus between the drill pipe and the borehole.

Because drill bits are subject to a high-erosion and high-wear environment, the bit body is sometimes constructed of an erosion-resistant material including a metal carbide enforced matrix, such as tungsten carbide with a metallic binder. Cutting elements on the drill bit may include natural diamond, synthetic diamond, Cubic Boron Nitride (CBN), or Polycrystalline Diamond Compact (PDC) cutters. These cutting elements may be cast into the bit body, as in an impregnated bit, or brazed into pockets located on the surface of the bit body. Erosion and wear-resistant materials are relatively brittle in tension and may crack under tensile loads, such as at thread contacts, and require specialized connections to other portions of the drill string. Traditionally the bit body is cast with a piece of steel in the center of the matrix body. The steel is later machined and welded to a connection for connecting to the drill string.

SUMMARY

In some embodiments, a cutting tool includes a base and a crown bonded to the base. The base has a base surface and a torque transfer feature extending from the base. The base may include a first material. The crown may include a cutting structure, and may be at least partially formed of a second material having a higher hardness than the first material. At least a portion of the crown contacts the base surface and the torque transfer feature, which transfers torque from the base to the crown. Optionally, a connector is coupled to the base opposite the crown and the base surface. The connector may include a threaded connection.

In some embodiments, a method for manufacturing a cutting tool includes providing a base including a first material. The base may include a base surface and a rotational axis about normal to at least a portion of the base surface. The base may also include a protrusion extending from the base surface. A first layer of a second material is applied to the base surface. The second material has a hardness higher than the first material and is applied adjacent the protrusion. The first layer of the second material may be sintered while on the base surface.

Another embodiment for manufacturing a cutting tool includes forming at least a portion of a base by applying a first material. The first material is sintered, and a second material is applied at least partially adjacent the first material at a contact. The second material forms at least a portion of a crown of a cutting tool. The second material is sintered, and sintering of the first and second materials forms a bond in which at least a portion of the first material impregnates the second material or at least a portion of the second material impregnates the first material.

In still another embodiment, a cutting tool includes a base of a first material, and a crown of a second material harder than the first material. The crown has cutting structure and is bonded to the base. At least a portion of the base impregnates the crown and/or at least a portion of the crown impregnates the base. Optionally, the base may include a box thread. In some embodiments, the base may be steel and the crown may include a metal matrix material.

This summary is provided to introduce a selection of concepts that are further described in the detailed description, and is not intended to identify key or essential features of the claimed subject matter, nor is it intended to be used as an aid in limiting the scope of the claimed subject matter. Additional features and aspects of embodiments of the disclosure will be set forth in the description that follows. These and other features will become more fully apparent from the following description and appended claims, or may be learned by the practice of such embodiments as set forth herein.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. While some of the drawings may be schematic or exaggerated representations of concepts, at least some of the drawings are to scale for some embodiments of the present disclosure. Understanding that the drawings depict some example embodiments, the embodiments will be described and explained with additional specificity and detail through the use of the accompanying drawings in which:

FIG. 1-2 is a longitudinal cross-sectional view of the drill bit of FIG. 1-1, showing torque transfer features between the base and the crown, according to some embodiments of the present disclosure;

FIG. 2 is a flow chart of a method of manufacturing a tool, according some embodiments of the present disclosure;

DETAILED DESCRIPTION

Figure 1:
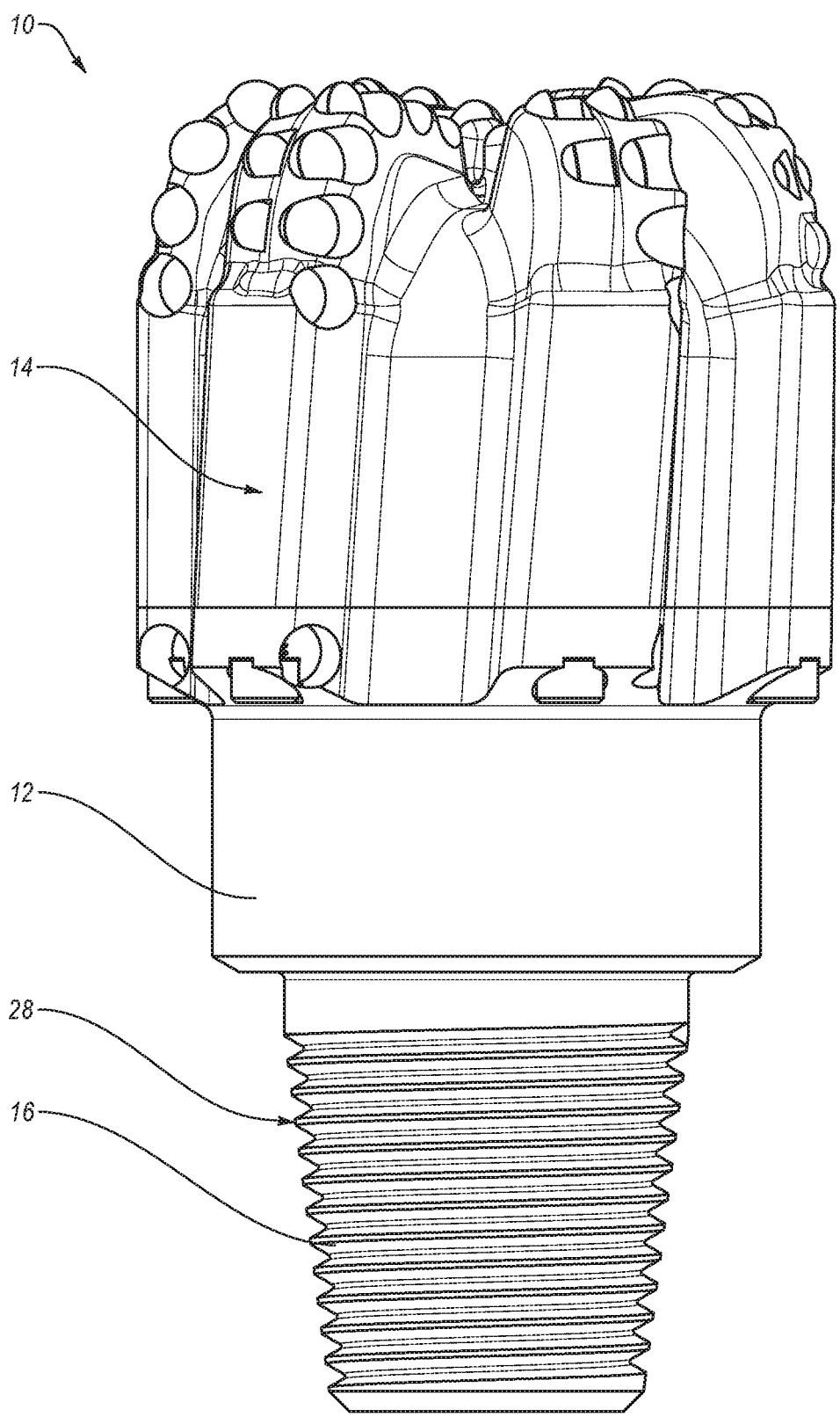
FIG. 1-1 is a side view of a drill bit with a crown connected to a base, according to some embodiments of the present disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

FIG. 1-1 shows a tool 10 comprising a base 12 and a crown 14, according to an embodiment of the present disclosure. In some embodiments, the tool 10 may be a cutting tool, such as a drill bit, mill, reamer, hole opener, or other cutting tool. In some embodiments, the tool 10 is a rotary drill bit with a cutting structure (e.g., blades) configured to hold one or more cutting elements (e.g., in pockets in one or more blades or other features of the drill bit). The base 12 includes at least a first material and crown 14 includes at least a second material. In some embodiments the first material and the second material may be different materials. For example, the first material may include steel, while the second material of crown 14 may include tungsten carbide (WC). In other examples, the first material may be a metal alloy, a weldable material, another material, or some combination of the foregoing. In some embodiments, the first material may have a higher toughness, lower brittleness, or higher ductility (or combinations of the foregoing) than the second material. The base 12 may be configured to mate with other components of a drill string. In some embodiments, the second material may have a higher hardness, higher erosion-resistance, or higher wear-resistance (or combinations of the foregoing) than the first material.

In some embodiments, the second material may include a metal matrix. The metal matrix may include metal carbides in a matrix with a binder. For example, the metal carbides may include carbides from Group IVB elements of the periodic table. In other examples, the metal carbides may include carbides from Group VB of the periodic table. Still other examples include metal carbides including carbides from the Group VIB elements of the periodic table. Yet other examples include metal carbides from Group VIM of the periodic table.

In some embodiments the binder in the metal matrix system may include a metallic cobalt binder, a nickel binder, a copper binder, or other binder materials. In some embodiments, the binder may include a metal alloy that is softer than the metal carbide. In yet other embodiments, the binder may include steel.

In some embodiments, the base 12 may include or be fixed to a connector 16. The connector 16 may include a mechanical connection surface 28, configured to connect the tool 10 to a variety of devices or components in a drill string, bottomhole assembly (BHA), or other system. For example, the connector 16 may include API, double-shoulder, or other threads to connect the cutting tool 10 to drill pipe or drill collars. In other examples, the connector 16 may connect the tool 10 to downhole instruments, including directional drilling assemblies, mud motors, hole enlargement, or other instruments.

Figures 1, 2:
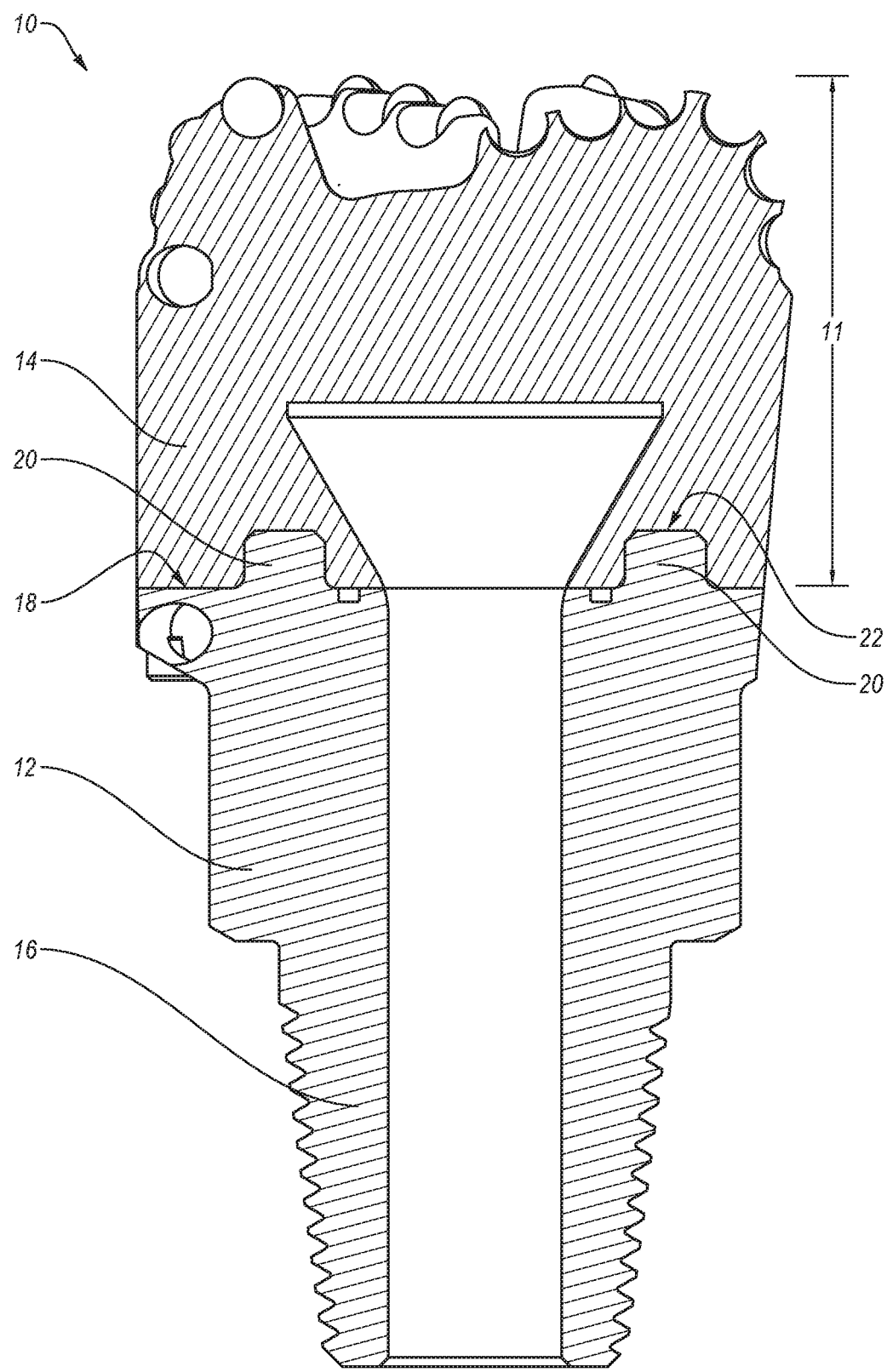
Figure 2:
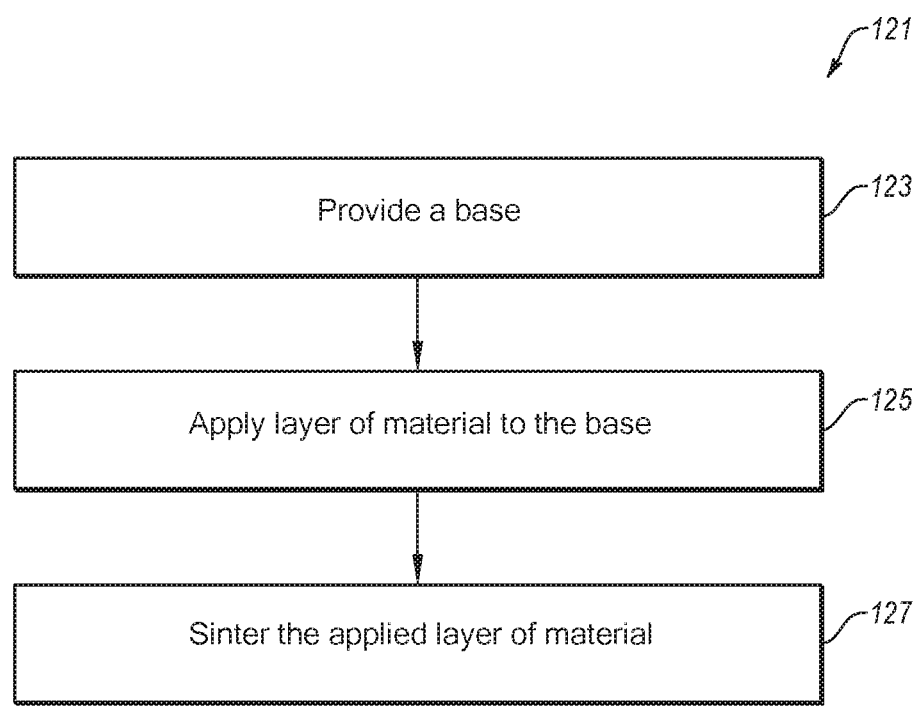

FIG. 1-2 is a cross-sectional view of the cutting tool 10. The base 12 may include a base surface 18. The base 12 may be generally planar, non-planar, or may have combinations of planar and non-planar surfaces. One or more protrusions 20 optionally protrude or otherwise extend from the base surface 18. In some embodiments, the protrusion(s) 20 may act as torque transfer feature between the base 12 and the crown 14. A distance from the nose of the crown 14 to the closest portion of the base surface 18 in a longitudinal direction may be referred to as a crown height 11 of the crown 14. The crown 14 may include one or more fluid passageways therein and/or therethrough to direct fluid received from the base 12 through the crown 14 to, e.g., cool the cutting tool 10 or flush cuttings from the cutting tool 10.

A protrusion 20 or torque transfer feature may have any of various shapes. For example, the protrusion 20 may be at least partially cylindrical. In other examples, the protrusion 20 may be at least partially conical, pyramidal, frusto-pyramidal, or cuboid. In some embodiments, the protrusion 20 may be integrally formed as a part of the base 12. In other embodiments, the protrusion 20 may be constructed separately, and later attached to the base 12. The crown 14 may include at least one recess 22 which may receive the protrusion 20. In some embodiments, the recess 22 may fully encompass the at least one protrusion. In other embodiments, the recess 22 may encompass a portion of the at least one protrusion. Encompassing the protrusion 20 with the crown 14 may mechanically interlock the crown 14 and the base 12. In some embodiments, mechanically interlocking the crown 14 and the base 12 to assist in transferring torque from the crown 14 to the base 12, which may strengthen the connection between the base 12 and the crown 14 by limiting relative rotation of the base 12 relative to the crown 14 (and vice versa). In some embodiments, the base 12 may have a recess and the crown 14 may include a protrusion extending into the recess.

In some embodiments, the crown 14 may be additively manufactured. Additive manufacturing, or 3D printing, includes a process of manufacturing an item in a series of discrete layers. Additive manufacturing may manufacture an item out of a variety of materials, including metal alloys, ceramics, and plastics. Additive manufacturing may be used to manufacture various items, including fasteners, drill bits, and other various parts of the embodiments disclosed herein.

FIG. 2 details an additive manufacturing method 121 by which a tool (e.g., tool 10) is assembled, according to an embodiment of the disclosure. The method includes providing a base at 123. The base may be provided 123 through various technique, including machining, casting, additive manufacturing, or combinations of the foregoing. A layer of a material (e.g., a second material different than a first material of the base) may be applied to the base at 125. The applied layer of material may also be sintered at 127.

In some embodiments, the crown 14 may be constructed separately from the base 12. For instance, the crown 14 may be built and sintered directly on top of the base surface 18 in acts 125, 127. In particular, the crown may be constructed by applying multiple layers on the base surface 18, including a first layer of a material at 125. In some embodiments, the applied material may be in a powder form. After or while applying the second material at 125, sintering may occur at 127. In some embodiments, the material may be applied at 125 in batches, followed by sintering at 127 of the batch. For example, an entire first layer may be applied at 125 as a complete sheet, followed by sintering the first layer all at once at 127. Other examples include applying 125 a portion of a layer of the material at 125, followed by sintering that portion of the material at 127. For example, 10% of a layer of the material may be applied at 125, followed by sintering of the 10% portion of the layer of the material at 127, followed by repetitions of applying at 125 and sintering at 127 of the layer of the material until a full layer is applied and sintered.

Each application at 125 need not apply the same percent of the area or material of a layer of the second material. For example, the method 121 may include applying and sintering at 125, 127 up to 5% of a layer of the material, followed by applying and sintering at 125, 127 up to 10% of the layer of the material, followed by applying and sintering at 125, 127 up to 20% of the layer of the material, followed by applying and sintering at 125, 127 up to 5% of the layer of the material, followed by applying and sintering at 125, 127 at least 60% of the layer of the material. This process is illustrative, and in other embodiments a portion of layer applied and sintered may be in a range having a lower value, an upper value, or lower and upper values including any of 0%, 10%, 20%, 30%, 40%, 50%, 60%, 70%, 80%, 90%, 100%, or any value therebetween. The applying at 125 and sintering at 127 of the additive manufacturing method 121 may be repeated as needed with as many different combinations of portions of a single layer of the material to complete the layer.

In other embodiments, applying at 125 and sintering at 127 of the material may occur simultaneously or near simultaneously. For example, an applicator may apply at 125 an amount of the material to a focused location, and a sintering device may sinter at 127 the material immediately after application. In some embodiments the sintering device is a laser or electron beam sintering device. Concurrently applying and sintering at 125, 127 the material allows for variable patterns of deposition of the material. For example, a layer of the material may be deposited in a series of concentric rings. Other examples include depositing the first layer of the second material in a linear pattern, a spiral pattern, a grid pattern, a series of stacking sine waves, a random or irregular pattern, or combinations of the foregoing.

The steps of applying and sintering at 125, 127 may be repeated as many times as necessary to complete manufacturing of the tool. For example, after completion of a first layer of the material, a second layer of the same or a different material may be applied and sintered at 125, 127, or in multiple repetitions of applying and sintering at 125, 127. In some embodiments, successive layers may be deposited using a similar technique, material, or pattern as the underlying layer. In other embodiments, successive layers may be deposited using a different technique, material, or pattern as the prior layer. For example, a layer may be applied at 125 and sintered at 127 in batches. A next layer may be applied at 125 and sintered at 127 as a complete sheet or in batches of different proportions, locations, patterns, etc.

The thickness of each of the layers is not particularly limited, but may be determined according to the desired properties of the tool 10, the properties of the material composition, the layering device, or combination thereof. For example, each of the layers may have a thickness within a range having a lower limit, an upper limit, or both lower and upper limits including any of about 0.0005 cm, 0.001 cm, 0.002 cm, 0.005 cm, 0.01 cm, 0.02 cm, 0.03 cm, 0.035 cm, 0.04 cm, 0.045 cm, 0.05 cm, 0.055 cm, 0.06 cm, 0.1 cm, or values therebetween. In another example, the layers may have a thickness from about 0.001 cm to about 0.06 cm, about 0.002 to about 0.05 cm, about 0.005 to about 0.04 cm, or about 0.01 to about 0.03 cm. Those skilled in the art will appreciate that the thickness of the layers may be adjusted based on desired end use performance, equipment capabilities, material composition or production capabilities, material shape, as well as other additional factors.

Figure 3:
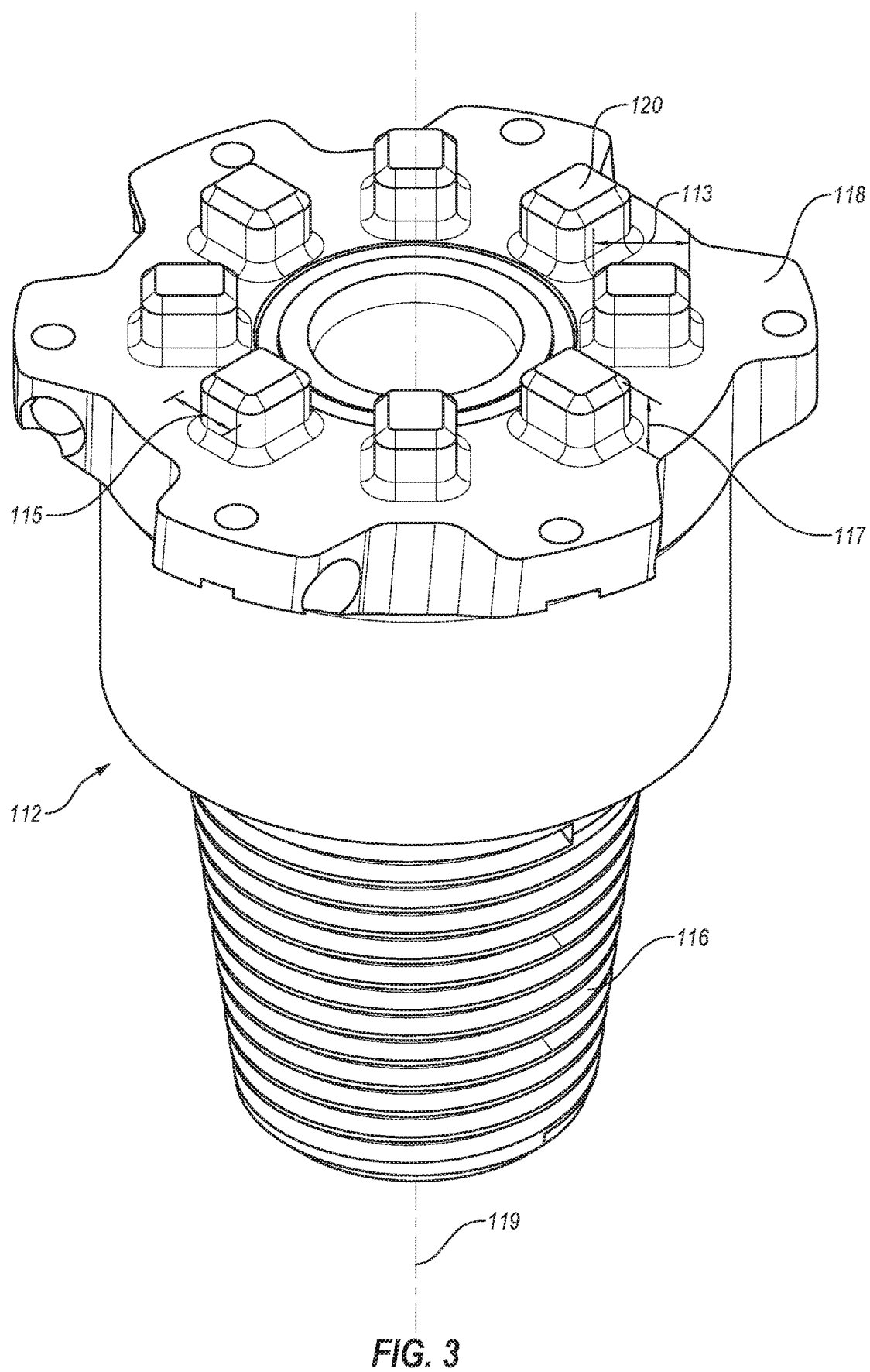
FIG. 3 is an isometric view of a base of a drill bit, according to some embodiments of the present disclosure.

FIG. 3 is an isometric view of an embodiment of a base 112, according to an embodiment of this disclosure. For illustrative purposes, and without limiting the scope of this disclosure (including the claims), a rotational axis 119 of the base may be about normal to a full or partial portion of the base surface 118. In some embodiments, the base 112 may include eight equally sized protrusions 120 or other torque-transfer features that are optionally spaced equidistantly around a rotational axis 119 of the base 112, and which extend axially from the base surface 118. In some embodiments, the protrusions 120 may be spaced at equal angular intervals about the rotational axis 119, and at a same radial distance from the rotational axis 119. In some embodiments, the protrusions 120 may be located around a center of the base surface 118. In at least one embodiment, the center of the base surface 118 may coincide with the rotational axis 119. Other embodiments may include any number of protrusions 120, placed in any pattern around the rotational axis 119 (including at unequal angular intervals or different radial positions). For example, the number of protrusions 120 may be related to the number of blades on a drill bit. On a drill bit with six blades, the base surface 118 may include six corresponding protrusions 120 radially inward from each blade. Other examples include a drill bit with six blades including six protrusions 120 located radially inward from the junk slots located angularly between the blades. In another example, a drill bit with six blades may include two protrusions 120 located on opposite ends of the base surface 118. Still more examples include a drill bit with four blades having four protrusions 120, located radially inward of the blade or the junk slots. A drill bit with four blades may also have two, six, or eight protrusions 120, located radially inward from both the blades and the junk slots, or one or more of which may be aligned with blades.

In other embodiments, the number of protrusions 120 may be unrelated to the number of blades, for example a drill bit with four blades may have five protrusions 120, or a drill bit with four blades may have three protrusions 120. Other examples include a drill bit with three blades having five protrusions 120. Still more examples include a drill bit with between one and three blades having six protrusions 120.

Additional embodiments may include irregular rotational spacing of the protrusions 120 around the rotational axis 119. For example, eight protrusions 120 may be placed at 0°, 30°, 45°, 120°, 150°, 270°, 320°, and 340° positions around the rotational axis 119 from a starting protrusion 120. An additional example includes three protrusions 120 located at 0°, 90°, and 180° positions. An additional example includes four protrusions 120 located at 0°, 60°, 155°, and 270° positions. Still other examples may include any number of protrusions located along any rotational spacing around the rotational axis 119.

In some embodiments, each protrusion 120 may be the same radial distance from the rotational axis 119. In one embodiment, a radially innermost portion of each protrusion 120 may be at a radial position that is 50% of the distance from the rotational axis 119 and the perimeter of the base 112. In still other embodiments, the radially innermost portion—or in other embodiments the center or radially outermost portion—of each protrusion 120 may be at a percentage of the distance from the rotational axis 119 to the perimeter of the base 112, including within a range having a lower value, an upper value, or lower and upper values including any of 0%, 10%, 20%, 30%, 40%, 50%, 60%, 70%, 80%, 90%, 100%, or any value therebetween. For example, each protrusion 120 may have an innermost portion at 0% of the distance from the rotational axis 119 to the perimeter of the base 112. In other examples, each protrusion 120 may be placed to have an outermost portion at 100% of the distance from the rotational axis 119 to the perimeter of the base 112. In yet other examples, each protrusion 120 may be placed in a range of 0% to 100% of the distance between the rotational axis 119 and the perimeter of the base 112. Still more embodiments may include protrusions 120 located at differing radii from the rotational axis 119.

In some embodiments, the placement of the protrusions 120 around the rotational axis 119 may follow any combination of rotational spacing and distance from the center of the base 112. For example, eight protrusions 120 may be located at each of 10%, 20%, 40%, 50%, 60%, 70%, 80%, and 90% of the distance from the rotational axis 119 to the perimeter of the base 112. The eight protrusions 120 may be located along each of 0°, 45°, 120°, 180°, 215°, 250°, 270°, and 300° angular positions. Additional examples include four protrusions 120, two of which begin at 25% of the distance from the rotational axis 119 and the perimeter of the base 112 and located at 0° and 120° positions, and two of which begin at 70% of the distance from the rotational axis 119 and the perimeter of the base 112 and located at 90° and 300° positions.

Still referring to FIG. 3, a protrusion 120 may have a cuboid or cubic or rectangular prismatic shape, according to an embodiment. The protrusion 120 optionally includes chamfered edges, and/or a chamfered connection between the protrusion 120 and the base surface 118. In other embodiments, the protrusion 120 may have other shapes as discussed herein, or may be domed, or include multiple edges, faces, or curves.

In some embodiments, the length 113 of the protrusion 120 may be a dimension measured in the radial direction and may be a percentage of the radial span of the base 112. The radial span may be the distance from the rotational axis 119 to the perimeter of the base 112. In some embodiments, for instance, the length 113 may be 10% of the radial span of the base 112. In other embodiments, the protrusion 120 may have a length 113 that, as a percentage of the radial span of the base, is in a range having a lower value, an upper value, or lower and upper values, including any of 0%, 10%, 20%, 30%, 40%, 50%, 60%, 70%, 80%, 90%, 100%, 110%, 120%, 130%, 140%, 150%, 160%, 170%, 180%, 190%, 200%, or any value therebetween. For example, the protrusion 120 may have a length 113 greater than 0% of the radial span of the base 112. In other examples, the protrusion 120 may have a length 113 less than 200% of the radial span of the base 112, or in other words spanning essentially the whole diameter of the base 112. In yet other examples, the protrusion 120 may have a length 113 in a range of 0% to 200% of the radial span of the base 112.

In some embodiments, the width 115 of the protrusion 120 may be a dimension in the rotational direction and may be 10% of the radial span of the base 112. In other embodiments, the protrusion 120 may have a width 115 as a percentage of the radial span of the base 112 in a range having a lower value, an upper value, or lower and upper values including any of 0%, 10%, 20%, 30%, 40%, 50%, or any value therebetween. For example, the protrusion 120 may have a width 115 greater than 0% of the radial span of the base 112, less than 50% of the radial span of the base 112, or in a range of 5% to 50% of the radial span of the base 112.

In some embodiments, the height 117 of the protrusion 120 may be 10% of the height of the crown (e.g., 10% of height 11 of FIG. 1-2). In other embodiments, the protrusion 120 may have a height 117 that is a percentage of the crown height. The height 117 may be, as a percentage of the crown height, in a range having a lower value, an upper value, or lower and upper values including any of 5%, 10%, 20%, 30%, 40%, 50%, 60%, 70%, 80%, 90%, 95% or any value therebetween. For example, the protrusion 120 may have a height 117 greater than 0% or greater than 5% of the crown height. In other examples, the protrusion 120 may have a height 117 less than 100% or less than 95% of the crown height. In yet other examples, the protrusion 120 may have a height 117 in a range of 5% to 95%, 5% to 50%, or 5% to 25% of the crown height.

In some embodiments, the sizes, shapes, and quantities of protrusions 120 may affect the transfer of force and torque from the crown to the base 112. For example, a taller and/or wider protrusion 120 may have higher load distribution to transfer torque more efficiently (or allow higher torque transfer) from the base 112 to the crown, while a shorter and/or narrower protrusion 120 may be less efficient at transferring torque, may have higher stress concentrations, or may transfer less torque. Similarly, more protrusions 120 may distribute the load to transfer more torque from the base 112, while fewer protrusions 120 may transfer less torque. An increased transfer of torque, or distribution of loads, may result in a stronger connection between the crown and the base 112, which may help prevent the crown and the base 112 from becoming disconnected.

Figure 4:
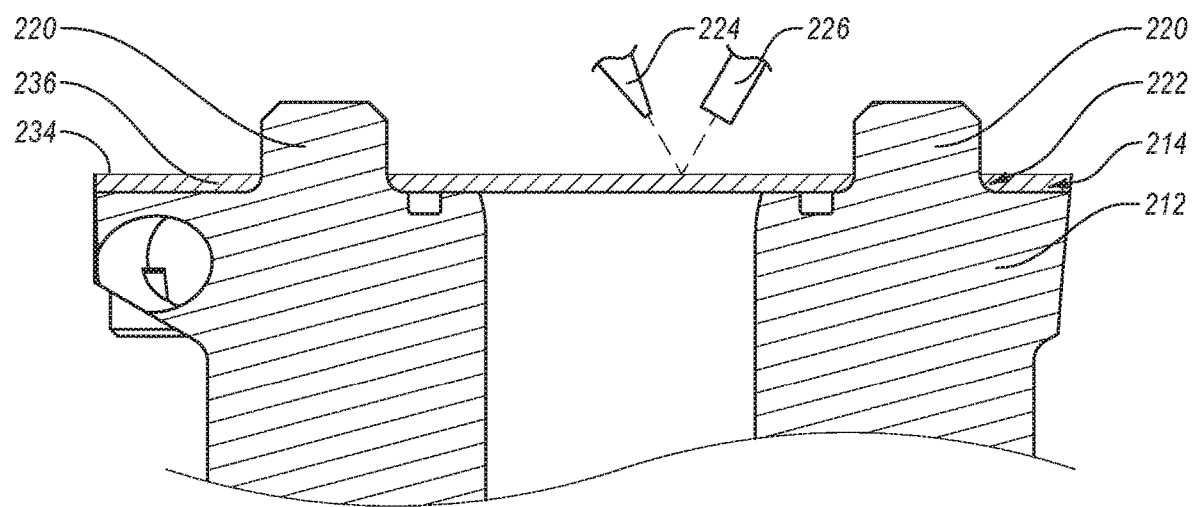
FIGS. 4-6 are schematic cross-sectional views of a drill bit base, with the crown being additively manufactured directly on the base, according to some embodiments of the present disclosure.
Figure 5:
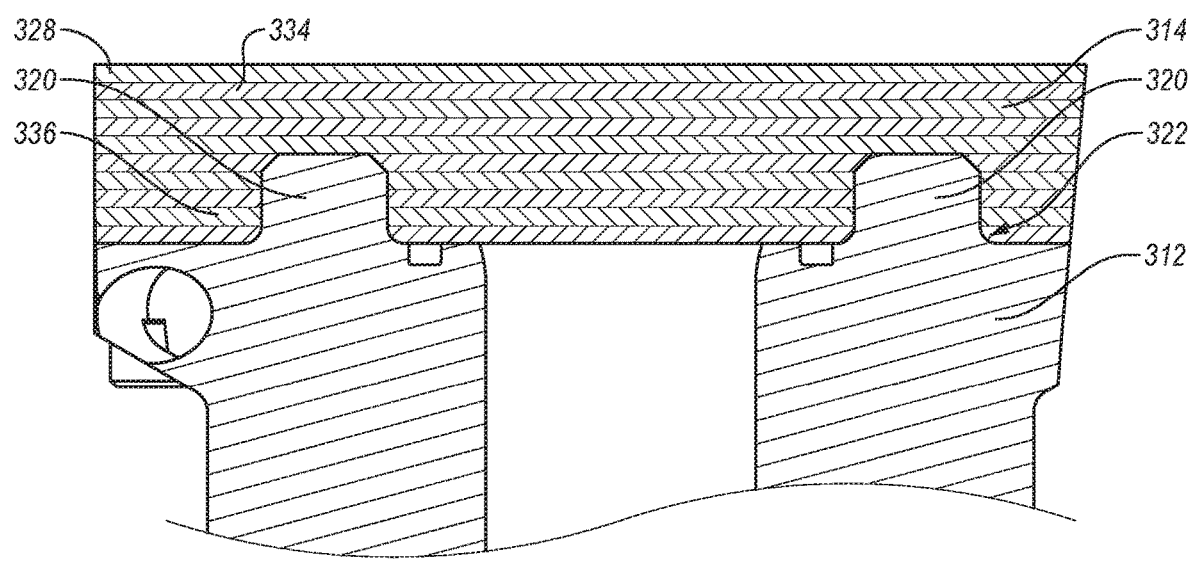
Figure 6:
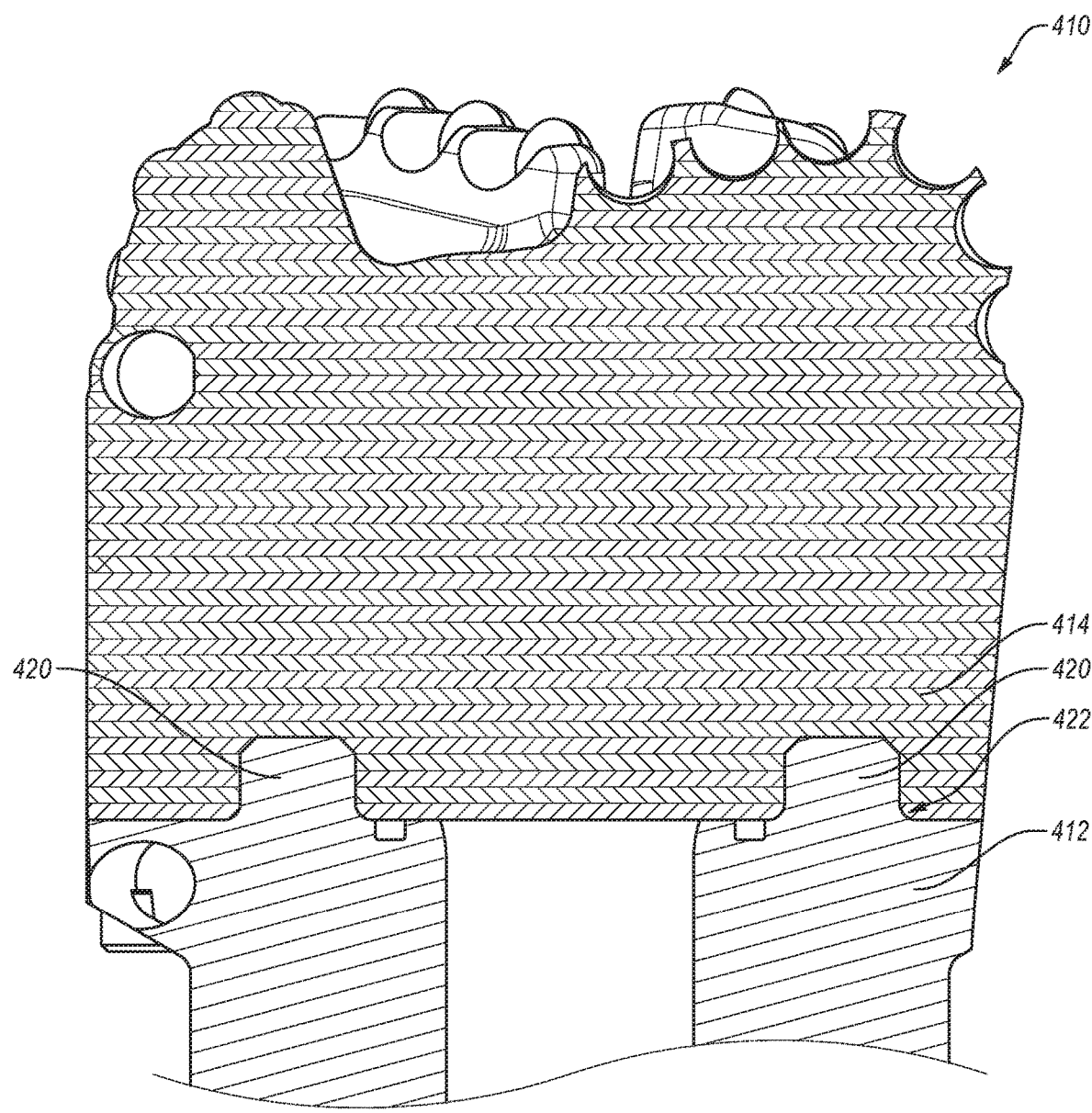

FIGS. 4-6 show embodiments of a crown 214, 314, 414 at different stages in an additive manufacturing process. FIG. 4 shows a first layer 234 of the crown 214 applied directly to a base 212. The first layer 234 may be of a material 236 that is deposited using any of various techniques. In some embodiments, the material 236 may be a second material that differs from a first material of the base 212. The first layer 234 may be applied in batches or as a single layer, either before or concurrent with sintering, as discussed herein with respect to FIG. 2.

The steps of applying and sintering may be repeated to form multiple layers, and may be repeated as many times as necessary to complete manufacturing of a cutting tool. For example, after completion of the first layer 234 of the material 236, a second layer may be applied and sintered in one or multiple repetitions of applying and sintering (e.g., as a single layer, in batches, with concurrent or subsequent sintering, etc.). The second layer may be formed of the same material 236 used to form the first layer 234, or may include a different material. In some embodiments, successive layers may be deposited using similar or different techniques, patterns, or materials as the underlying layer.

In some embodiments, a recess 222 that receives the protrusion 220 may be constructed into the crown 214 during additive manufacturing, by depositing the first layer directly on the base 212 and around the protrusion 220. Accordingly, the transverse cross-sectional area of the crown 214 may be non-uniform. In some embodiments, the recess 222 may be constructed using an applicator 224 and a sintering device 226 to deposit the second material 236 in a pattern around the protrusion 220. In the same or other embodiments, the recess 222 may be constructed using batch deposition of one or more materials 236, with a batch deposited around the protrusion 220.

In some embodiments, a layer may be on a single plane. In some embodiments, the first layer 234 of the material 236 may form a non-planar or disjointed surface. For example, the first layer 234 of the material 236 may be deposited using an applicator 224 and a sintering device 226 directly on the walls and/or top surface of the protrusion 220. Multiple layers of the material 236 may be deposited on the protrusion by repeatedly applying and sintering using an applicator 224 and a sintering device 226. In other embodiments, one section of the crown 214 may receive thicker deposits of the second material 236 by repeatedly applying and sintering over the same area using an applicator 224 and a sintering device 226.

In some embodiments, the recess 222 is fully formed in the first layer 234 of the second material 236. In some embodiments, the recess 222 fully encompasses the protrusion 220. In other embodiments, at least part of the protrusion 220 extends from a portion of the recess 222 defined by the first layer 234.

In some embodiments, sintering of the crown 214 directly to the base 212 may create a bond between the crown 214 and the base 212. Bonding the crown 214 to the base 212 may help to prevent the crown 214 and the base 212 from becoming inadvertently disconnected. Additionally, in some embodiments, the bond created by sintering and the strengthened connection created by the mechanical interlocking of the protrusions 220 and the crown 214 may contribute to a strong connection between the crown 214 and the base 212.

Referring to FIG. 5, after the first layer 334 of the material 336 is deposited, the second layer 328 of the material 336 may be deposited. The second layer 328 of the material 336 is deposited directly on the first layer 334 of the material 336. The second layer 328 of the material 336 may be deposited using any of the techniques described for depositing the first layer 334 of the material 336. For example, the second layer 328 of the material 336 may be applied and sintered in batches or as a complete layer as discussed with respect to FIG. 2.

Referring to FIG. 6, repeated application and sintering of successive layers may create a completed crown 414. In some embodiments, the completed crown 414 may include a recess 422 that fully encompasses the protrusion 420 in axial (upward in FIG. 6) and radial (left and right in FIG. 6) directions. Additive manufacturing of the crown 414 may allow formation of complex geometries that would otherwise be impractical or not cost-effective using other manufacturing techniques.

Figure 7:
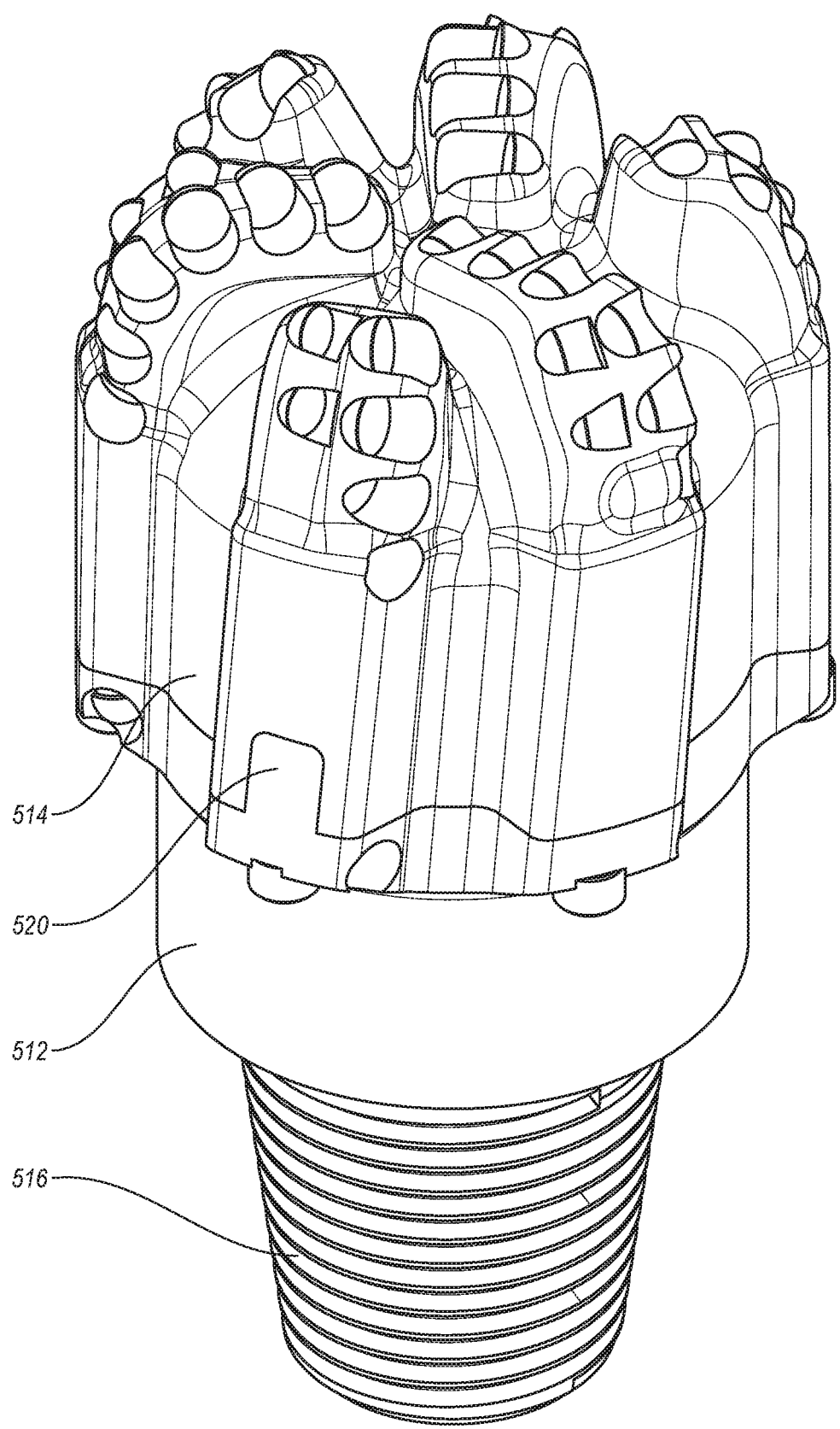
FIG. 7 is an isometric view of a drill bit with a crown connected to a base, according to additional embodiments of the present disclosure.

Referring to FIG. 7, in some embodiments, a protrusion 520 or other torque transfer feature may extend to or beyond the perimeter of the crown 514. In some embodiments, the crown 514 may encompass a portion (e.g., all but one surface) of the protrusion 520. In FIG. 7, for instance, each surface other than the radially outer surface may be covered by the crown 514. In some embodiments, the crown 514 may encompass 90% of the surface area of the protrusion 520. In other embodiments, the crown 514 may encompass a portion of the surface area of the protrusion 520 that is in a range having a lower value, an upper value, or lower and upper values including any of 5%, 10%, 20%, 30%, 40%, 50%, 60%, 70%, 80%, 90%, 100%, or any value therebetween. For example, the crown 514 may encompass greater than 50% of the surface area of the protrusion 520. In other examples, the crown 514 may encompass less than 100% of the surface area of the protrusion 520. In yet other examples, the crown 514 may encompass a portion of the surface area of the protrusion 520 in a range of 10% to 100%, 20% to 90%, 30% to 80%, or 80% to 95%.

Figure 8:
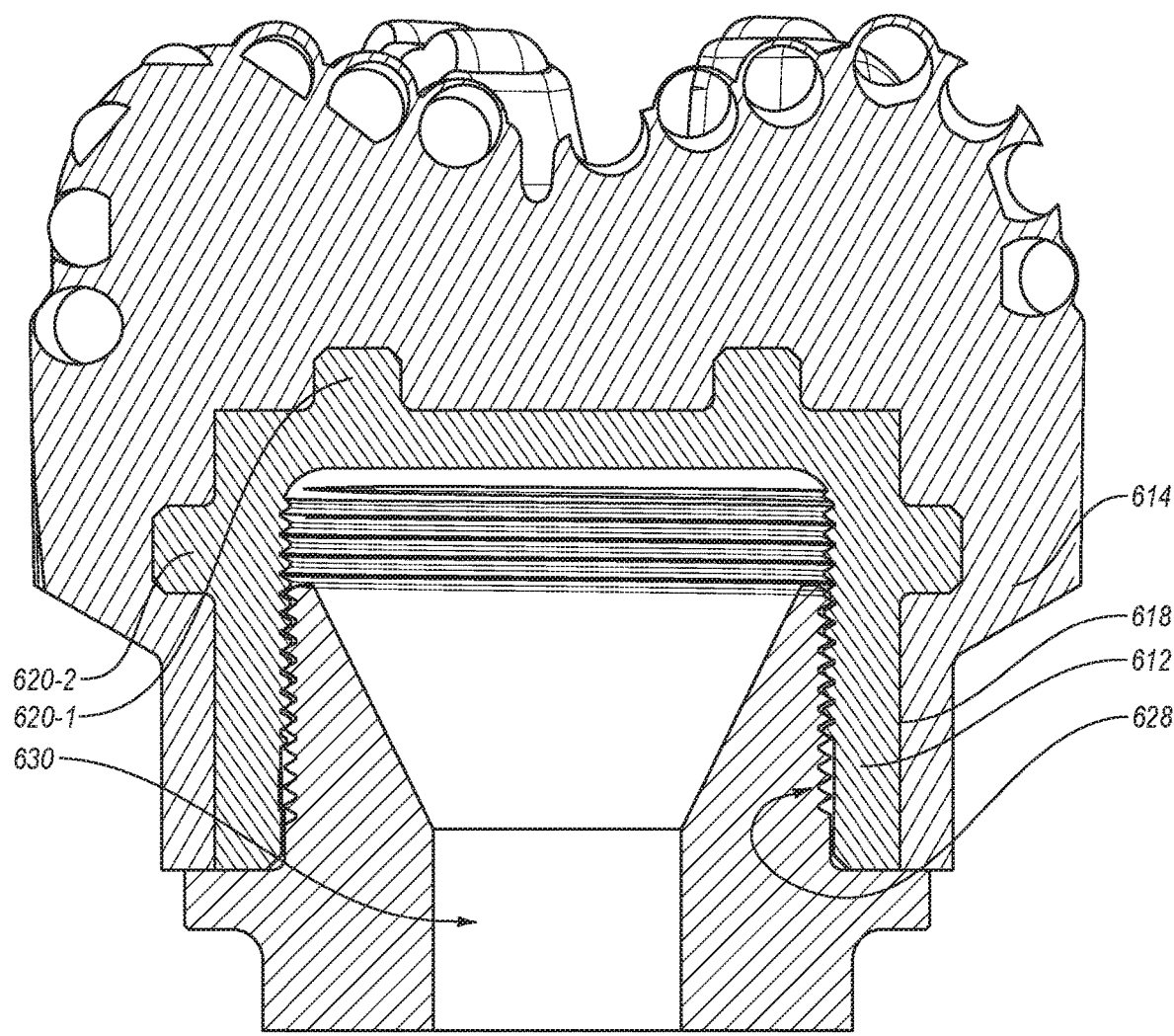
FIG. 8 is a schematic cross-sectional view of another tool manufactured on a base having an internal mechanical connection, according to some embodiments of the present disclosure.

Referring to FIG. 8, in some embodiments the base 612 may include a connector that is integrally formed or otherwise attached to the base 612. In some embodiments, the connector may include a mechanical connection surface 628 internal to the connector and base 612. For instance, the mechanical connection surface 628 may include a set of box threads for connecting to the pin end of a connecting shaft 630. In other embodiments, the mechanical connection surface may include a mechanical latch, mechanical fasteners, or the like.

In some embodiments, the base 612 may have a base surface 618 that is at least partially oriented in a radial direction. In the same or other embodiments, the base 612 may include a protrusion 620-2 or other torque transfer or interlocking feature protruding in a radial direction. In some embodiments, the protrusion 620-2 may be located at the bottom end portion of the base 612 farthest from the nose of the crown 614. In other embodiments, the protrusion 620-2 may be located at the top of the base 612 nearest the nose of the crown 614. In still other embodiments, the protrusion 620-2 may be located part of the way between the top and the bottom end portions of the base 612. In some embodiments, the base 612 may include at least one protrusion 620-1, extending from the base surface 618 in a longitudinal direction, and at least one protrusion 620-2, extending from the base surface 618 in a radial direction. In some embodiments, the crown 614 may be manufactured using additive manufacturing processes similar to that disclosed herein with respect to FIGS. 2-7.

Figure 9:
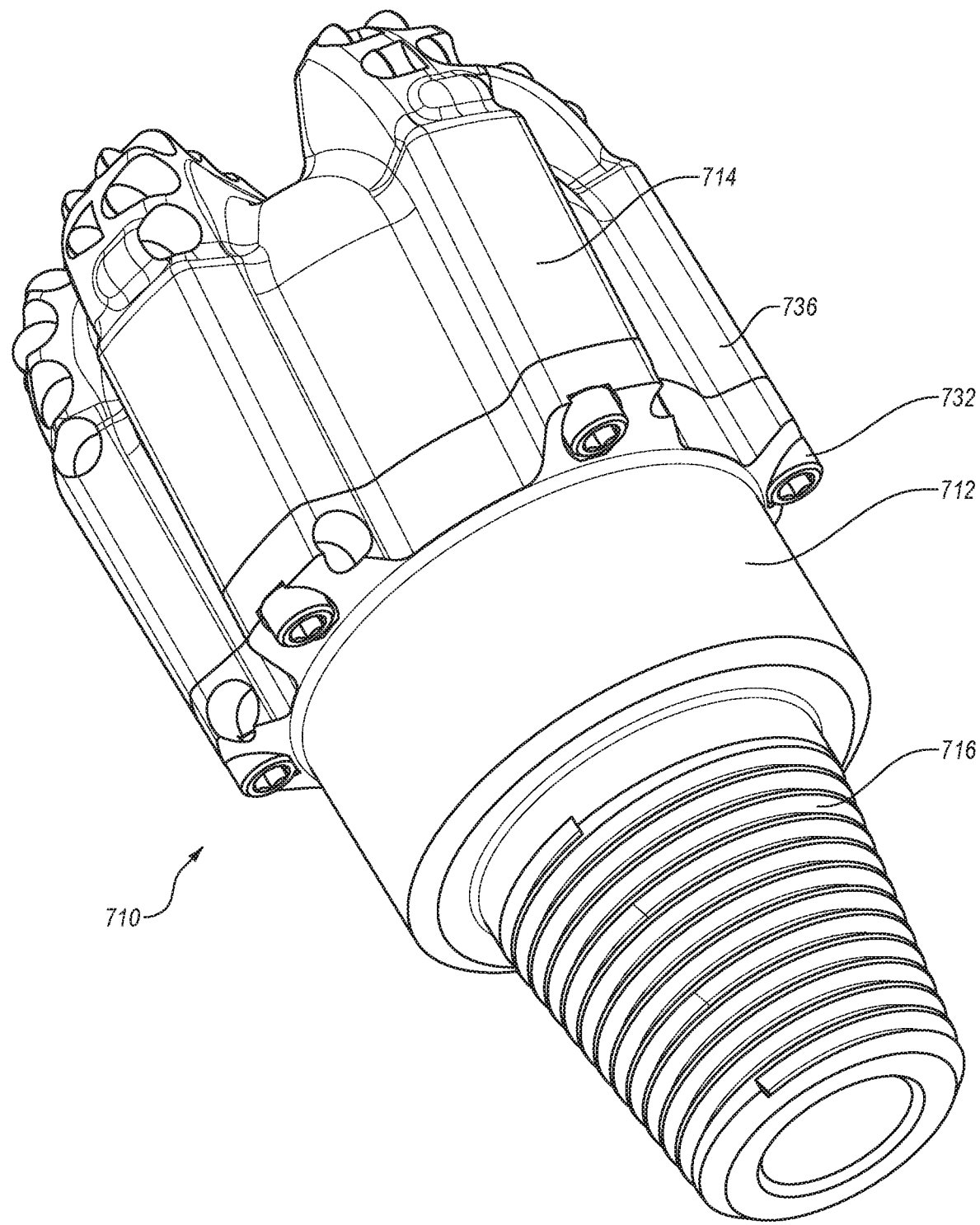
FIG. 9 is an isometric view of a drill bit with a base coupled to a crown using mechanical fasteners, according to some embodiments of the present disclosure.

Referring to FIG. 9, in at least one embodiment, the base 712 may connect to the crown 714 using at least one fastener 732. In the same or other embodiments, the base 712 and/or connector 716 may connect to the crown 714 using 1, 2, 3, 4, 5, 6, 7, 8, or more fasteners 732. In still other embodiments, the base 712 may connect to the crown 714 using the at least one fastener 732 in addition to a bond created during sintering of the a material 736 on the base 712. In other embodiments, the crown 714 is manufactured separately from the base, and therefore is connected to the base 712 using the at least one fastener 732, but without a metallurgical or other similar bond. The fastener 732 may provide additional support to keep the crown 714 connected to the base 712 when the tool 710 is in tension, by restricting axial and/or rotational movement of the crown 714 relative to the base 712 (and vice versa).

The fastener 732 may connect the crown to the base using a variety of techniques. In some embodiments, the fastener 732 may have a threaded pin or shaft, with matching box threads located inside the crown 714. In other embodiments, the fastener 732 may include an expansion bolt. In still other embodiments, the fastener 732 may include a nut, included in the crown 714 during additive manufacturing, to which a bolt may connect. In yet other embodiments, the head of the fastener 732 may have a bar shape transverse to the body of the fastener 732. The head may then extend into a shaft in the crown 714, and rotate into a slot manufactured into the crown 714, and then tightened to the base 712 using a threaded nut.

Figure 10:
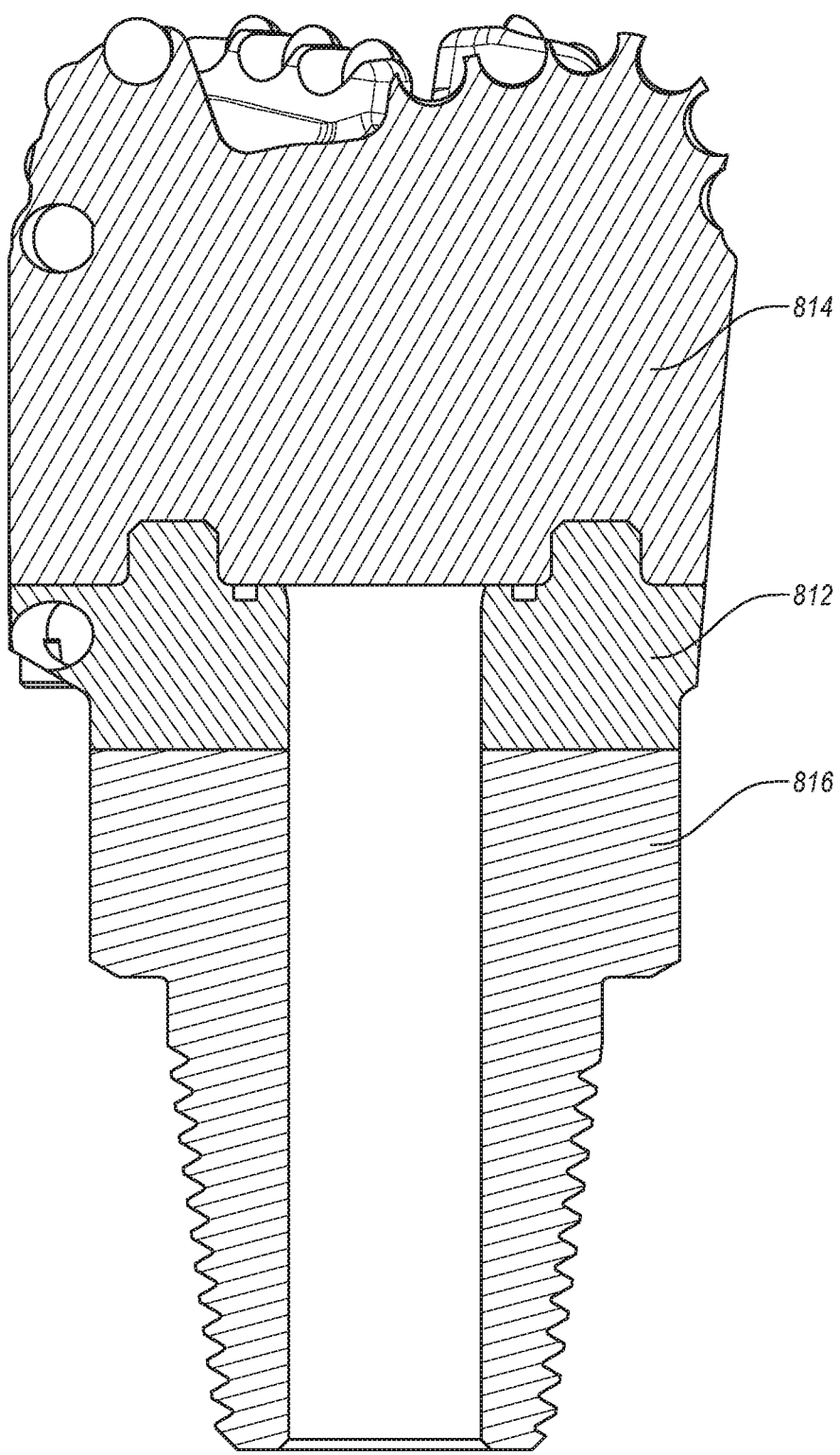
FIG. 10 is a longitudinal cross-sectional view of a tool with a base separable from a connector, according to some embodiments of the present disclosure.

Referring now to FIG. 10, a base 812 may connect separately to the connector 816. In some embodiments, the base 812 may connect to the connector 816 by a welded connection. In other embodiments, the base 812 may connect to the connector 816 with a mechanical connection. The mechanical connection may include a threaded connection, fasteners, or other mechanical connections, including those discussed herein. The crown 814 may connect to the base 812 and may be formed using conventional processes, or using additive manufacturing processes, including any processes discussed herein.

Figure 11:
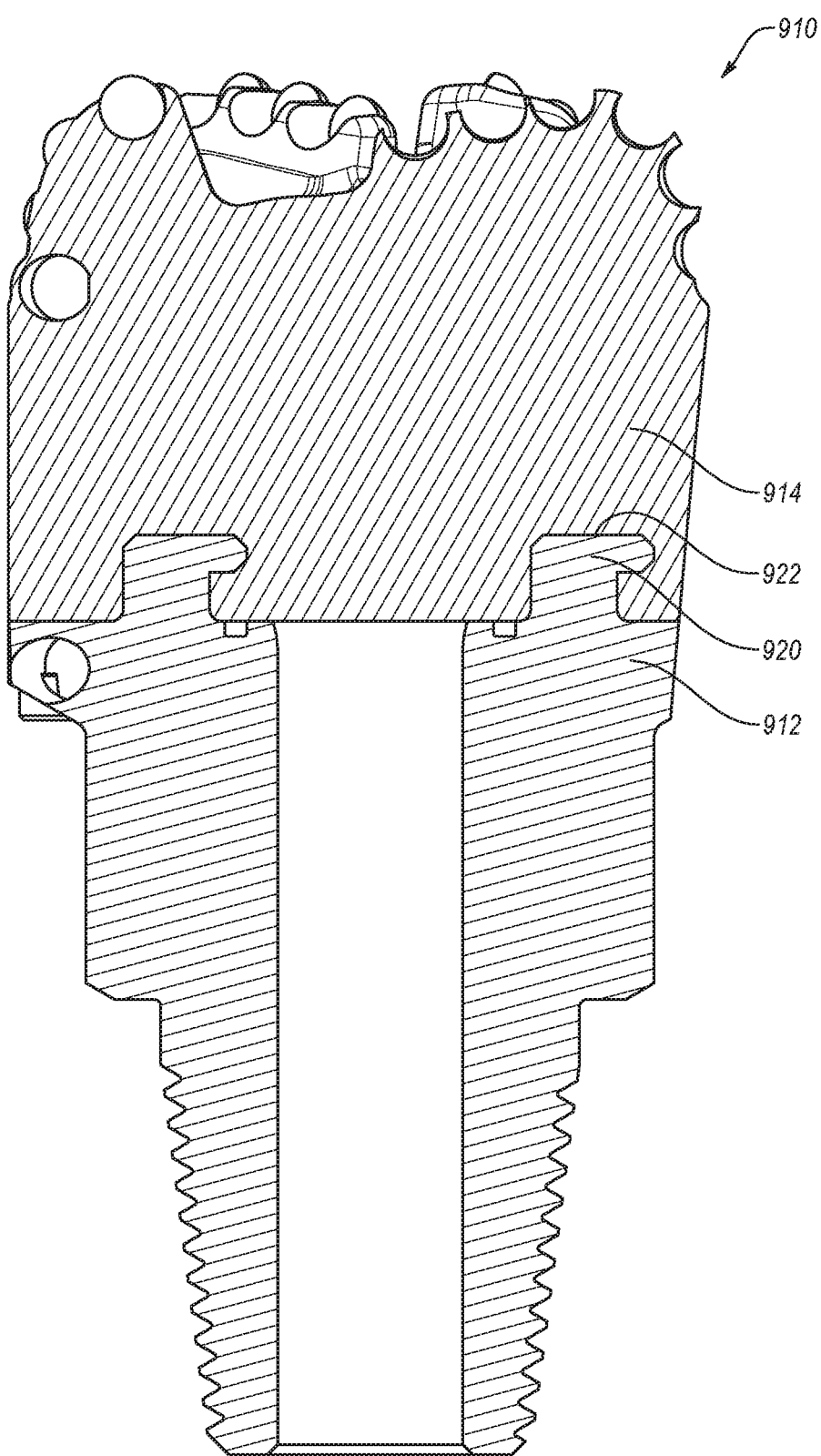
FIG. 11 is a longitudinal cross-sectional view of a tool with interlocking torque transfer devices, according to some embodiments of the present disclosure.

With reference to FIG. 11, a base 912 may include a protrusion 920 or other torque transfer or interlocking feature shaped to form a mechanical connection with the crown 914. In some embodiments, fabrication of the crown 914 may occur separately from the base 912 (e.g., through an additive manufacturing process as described herein). The recess 922 may be formed to receive the protrusion 920 in such a manner to create an interlocking, mechanical connection. For example, the protrusion 920 may form an upside down "L" shape, which may then lock in place with a similarly shaped recess 922, the bar of the "L" pointed opposite the rotation of the tool 910. The shape of the protrusions 920 may be used to restrict and potentially prevent, relative axial and rotational movement of the base 912 relative to the grown 914. In some embodiments, a series of protrusions 920 are configured to connect with threads on the inside of the crown 914. Still other embodiments include at least one protrusion 920 configured to receive a fastener, the fastener configured to connect through matching shafts in the base 912 and the crown 914, and connect to the protrusion 920.

Figure 12:
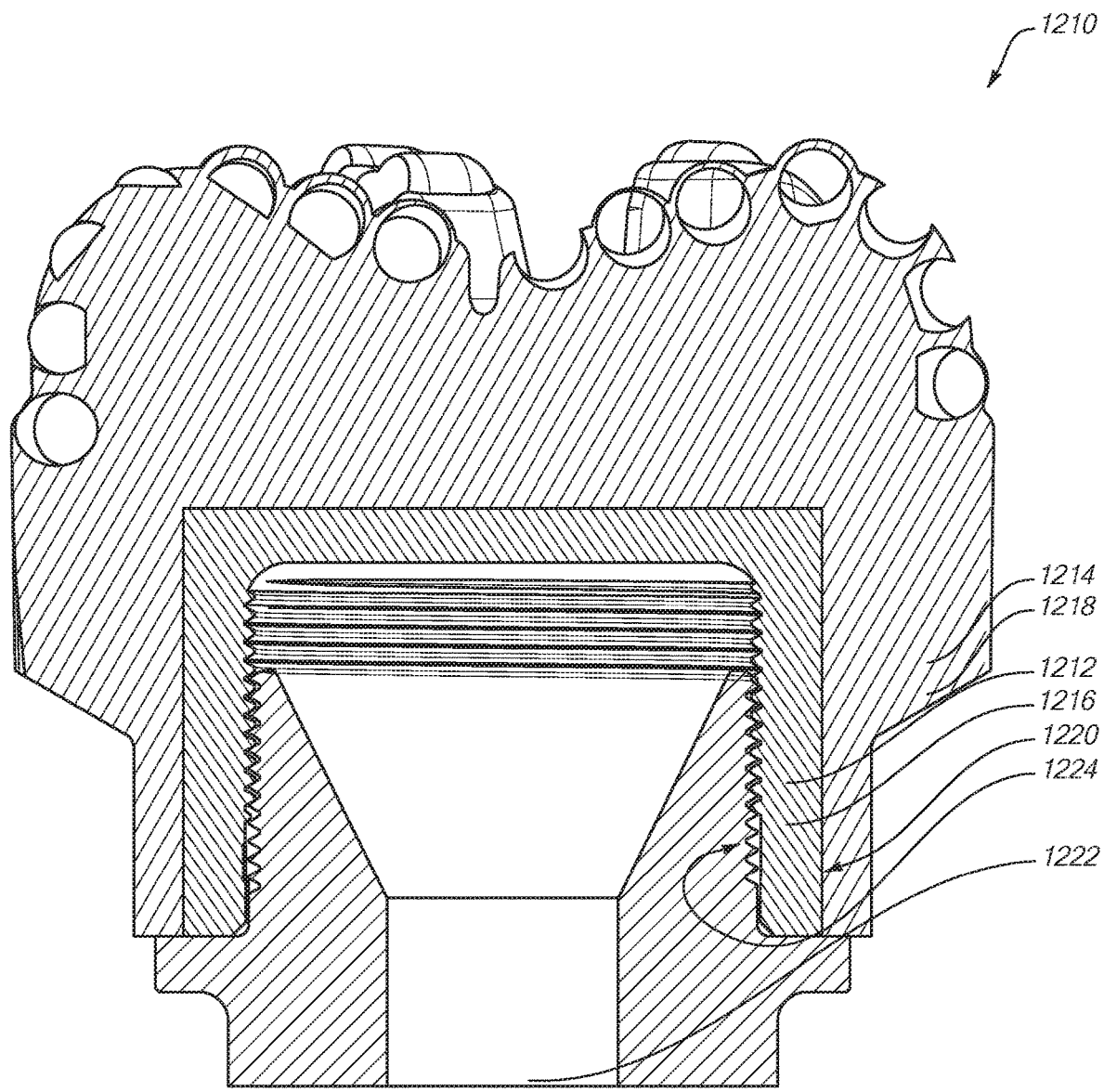
FIG. 12 is a side cross-sectional view of a tool with a crown and base, according to embodiments of the present disclosure.

While embodiments of the present disclosure may include protrusions or other torque transfer features, the present disclosure is not limited to manufacturing tools that include such features. FIG. 12, for instance, illustrates a tool 1210 comprising a base 1212 and a crown 1214, according to some embodiments of the disclosure. In some embodiments, the tool 1210 may be a cutting tool such as a drill bit, mill, reamer, hole opener, or other cutting tool configured to hold at least one cutting element and/or cut a workpiece. The base 1212 and the crown 1214 may meet at an interface such as contact 20. The base 1212 may include a first material 1216 and crown 1214 may include a second material 1218 the same as, or different than, the first material 1216. In some embodiments, the first material 1216 may have a higher toughness or ductility, or lower brittleness, than the second material 1218, and may be configured to mate with components of a drill string or BHA. In some embodiments, the second material 1218 may have a higher hardness, wear-resistance, or erosion-resistance than the first material 1216 such that the crown 1214 may be more wear or erosion-resistant than the base 1212. In some embodiments, the first material may be a machinable material. As used herein, "machinable" is understood to refer to those materials that are able to be cut, formed, or otherwise manipulated at or below 100° C. with conventional machining techniques. For example, the first material 16 may be steel. In other examples, the first material may be a metal alloy. Still other examples include a weldable material.

In some embodiments, the second material 1218 may be steel. In other embodiments, the second material 1218 may be a metal alloy. In still other embodiments, the second material 1218 may be an ultrahard material. As used herein, the term "ultrahard" is understood to refer to those materials known in the art to have a grain hardness of at least about 1,500 HV (Vickers hardness in kg/mm$^2$). Such ultrahard materials can include those capable of demonstrating physical stability at temperatures above about 750° C., and for certain applications above about 1,000° C., that are formed from consolidated materials. Such ultrahard materials can include but are not limited to tungsten carbide, diamond, polycrystalline diamond (PCD), leached metal catalyst PCD, non-metal catalyst PCD, hexagonal diamond (Lonsdaleite), cubic boron nitride (cBN), polycrystalline cBN (PcBN), binderless PCD or nanopolycrystalline diamond (NPD), Q-carbon, binderless PcBN, diamond-like carbon, boron suboxide, aluminum manganese boride, metal borides, boron carbon nitride, and other materials in the boron-nitrogen-carbon-oxygen system which have shown hardness values above 1,500 HV, as well as combinations of the above materials. In some embodiments, the ultrahard material may have a hardness value above 2,000 HV, above 2,500 HV, or above 3,000 HV. In further embodiments, the ultrahard material may have a hardness value greater than 80 HRa (Rockwell hardness A).

In some embodiments, the second material 1218 may include a metal matrix as discussed herein, including metal carbides from Groups IVB, VP, or VIB matrixed with a binder. In some embodiments the binder in the metal matrix may include a metallic cobalt binder. In other embodiments, the binder may include nickel, copper, a metal alloy that is softer than the metal carbide, or steel.

In some embodiments, the base 1212 may include or be fixed to a connector 1222. The base 1212 may include a mechanical connection surface 1224. The connector 1222 in turn may attach to a variety of devices or components in a drill string and/or bottomhole assembly (BHA). In other examples, the connector 1222 may connect the tool 1210 to downhole instruments, including directional drilling assemblies, mud motors, drill collars, reamers, or other tools or instruments used in conjunction with the tool 1210.

Figure 13:
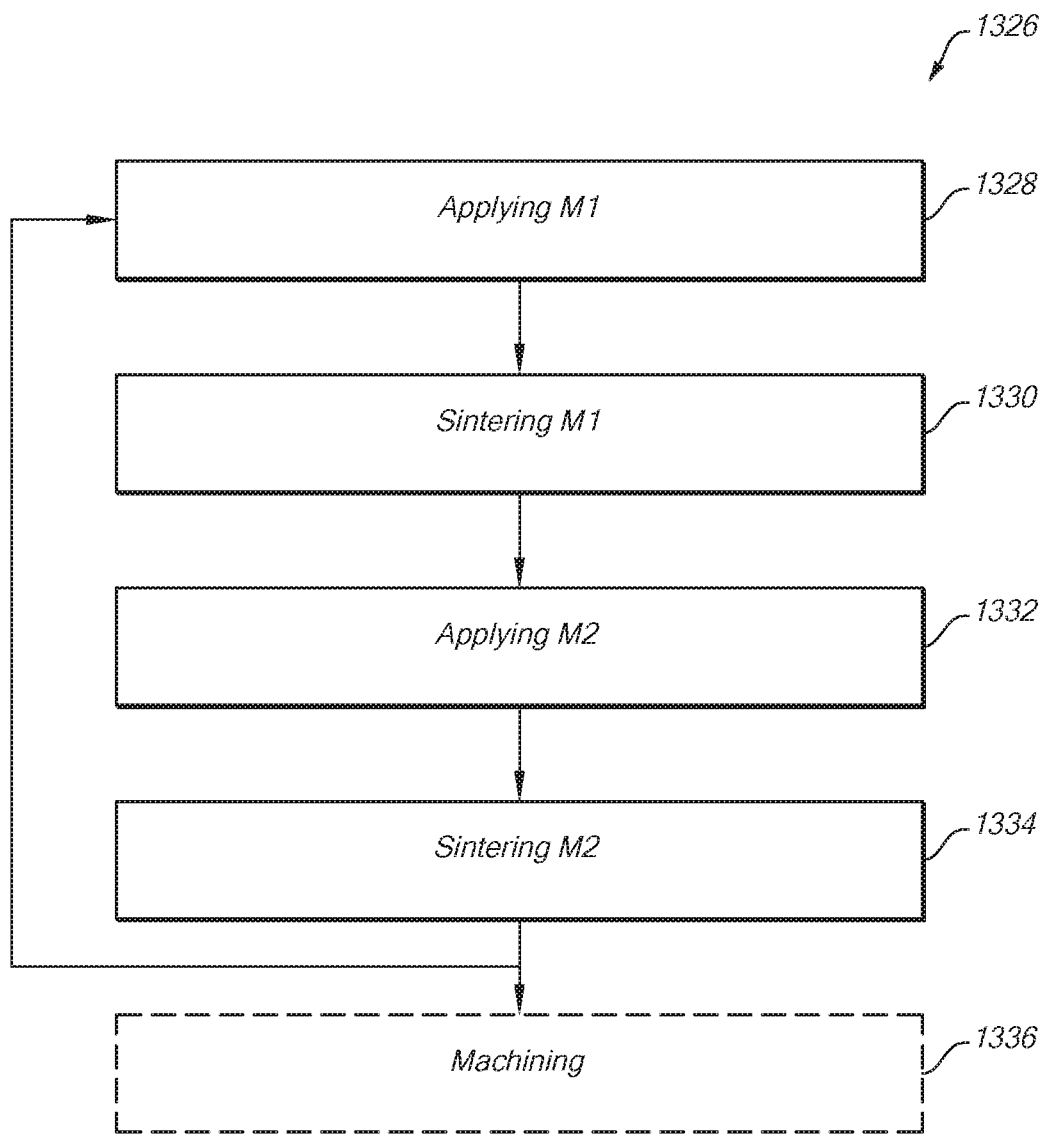
FIG. 13 is a flow chart of a method used to manufacture a tool, according to embodiments of the present disclosure.

FIG. 13 details an additive manufacturing method 1326 by which a tool, such as tool 1210 in FIG. 12, may be assembled, according to some embodiments of this disclosure. The method includes applying at least a portion of a first material (M1) at 1328, sintering the portion of the first material at 1330, applying at least a portion of a second material (M2) at 1332, and sintering the portion of the second material at 1334. In some embodiments, at least a portion of the first or second material may be machined at 1336. In some embodiments, applying the first material at 1328 and applying the second material at 1332 may occur separately, but in other embodiments, may occur concurrently. In some embodiments, sintering the first material at 1330 and sintering the second material at 1334 may occur separately, but in other embodiments may occur concurrently. For example, the first material may be applied 1328 at the same time the second material is applied 1332, followed by sintering 1330 of the first material at the same time as sintering 1334 of the second material. In other examples, the first material may be applied at 1328, after which the second material may be applied at 1332, following which the first material may be sintered at 1330, after which the second material may be sintered at 1334. Any combination and order of applying and sintering the first and second materials is conceived by this disclosure.

An embodiment of a tool may be manufactured by repeating the steps of applying at 1328, sintering at 1330, applying at 1332, and sintering at 1334 as many times as necessary to achieve the desired geometry. Each repetition during manufacturing may create a layer or a portion of a layer. To create the desired geometry, an individual layer may contain only the first material, only the second material, or both the first and second materials. For example, one repetition may include applying the first material at 1328 and sintering the first material at 1330. Another repetition may include applying the second material at 1332 and sintering the second material at 1334. Still another repetition may include applying the first material at 1328, sintering the first material at 1330, applying the second material at 1332, and sintering the second material at 1334. In some embodiments, the tool may include at least one layer including only the first material, at least one layer including only the second material, at least one layer including both the first material and the second material, or any combination of the foregoing. In yet other embodiments, each layer of the tool may include both the first material and the second material.

The thickness of each of the layers is not particularly limited, but may be determined according to the desired properties of the tool to be built, the properties of the material composition, the layering device, or any combination thereof. For example, each of the layers may have a thickness as discussed herein with respect to the method 121 of FIG. 2.

Figure 14:
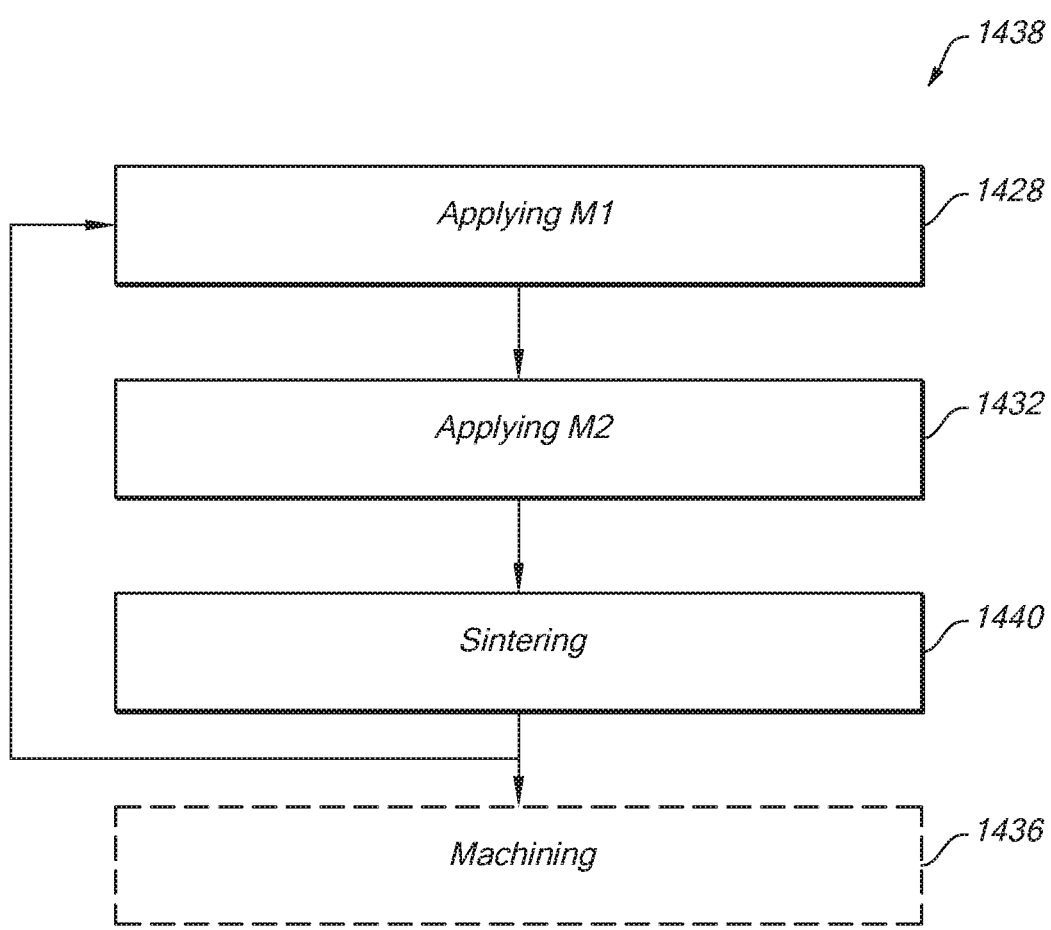
FIG. 14 is a flow chart of another method to manufacture a tool, according to embodiments of the present disclosure.

Referring to FIG. 14, another embodiment of a manufacturing method 1438 includes applying a first material at 1428, applying a second material at 1432, and sintering both the first and second materials at 1440. Optionally, the first and/or second material may also be machined or otherwise processed at 1436. In some embodiments, the first material may be applied first, followed by applying the second material. In other embodiments, the second material may be applied first, followed by applying the first material. Still other embodiments include applying concurrent application of the first and second materials at 1428, 1432. As used herein, simultaneous or concurrent events occur in close physical proximity to each other in addition to occurring at about the same time.

For explanation purposes, and without limiting the present disclosure, the techniques used to manufacture the tool are described using applying 1428 and sintering 1440 the first material. It should be understood that the same techniques may be used for applying 1432 and sintering 1440 the second material. Application or a first material and/or a second material may be accomplished using a variety of techniques. In some embodiments, and as discussed in more detail with respect to FIG. 2, the first material may be applied 1428 in batches, followed by sintering 1440 of the batch, or an entire layer may be applied 1428, followed by sintering 1440 the entire layer all at once. Where batches of the first material are applied at 1428, each application may apply about an equal percentage of a layer, or different percentages of the layer, as discussed herein. Applying at 1428 and sintering at 1440 may occur in sequence, or simultaneously/concurrently.

In some embodiments, the applying a portion of a layer at 1428 may include applying a portion of a layer that is not the same layer as immediately preceding. For example, a portion of a second layer may be applied onto a portion of a first layer before the first layer is complete. In other embodiments, an additional portion of the first layer may be applied after a second layer (or other layer) is begun.

Figure 15:
FIG. 15 is a schematic side cross-sectional view of a partially completed tool in which the base and crown are additively manufactured, according to embodiments of the present disclosure.

FIGS. 15-18 show embodiments of various stages of an example manufacturing process, according to some embodiments of the present disclosure. FIG. 15 outlines an embodiment where the bottom portion of a tool is being manufactured. In some embodiments, a base 1512 and a crown 1514 may be deposited in the same layer, with the base 1512 internal to the crown 1514. In other embodiments, a complete layer of the crown 1514 may be deposited prior to any depositing of the base 1512. For example, the crown 1514 may cover the radially outer surface of the base 1512. In at least one embodiment, a first applicator 1542-1 may apply, and a first sintering device 1544-1 may sinter, the first material 1516 immediately adjacent to a second applicator 1542-2 applying the second material 1518 and a second sintering device 1544-2 sintering the second material 1518.

Figure 16:
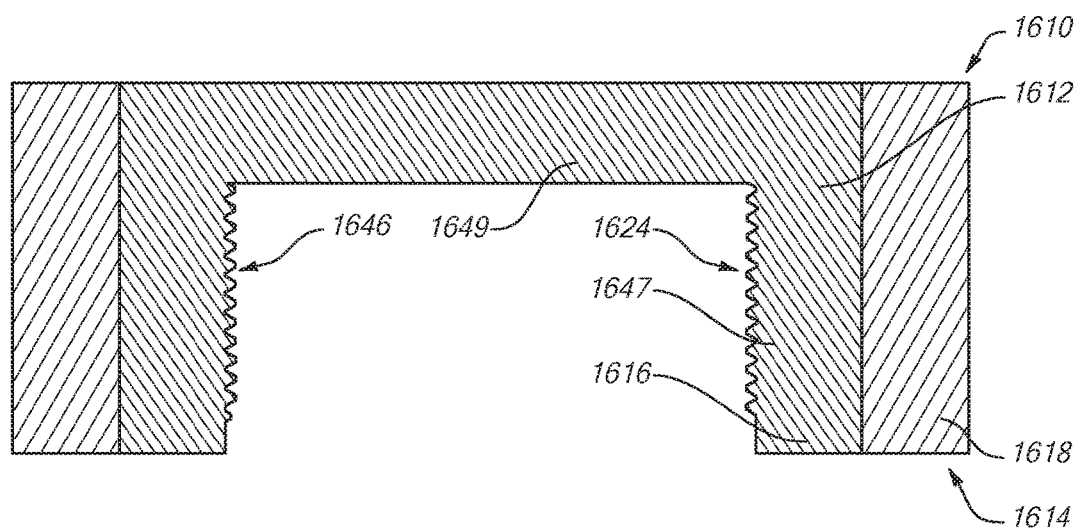
FIG. 16 is a schematic side cross-sectional view of a partially completed tool in which the base and crown are additively manufactured, according to another embodiment of the present disclosure.

FIG. 16 is a schematic diagram of a partially completed tool 1610, according to an embodiment of the present disclosure. In at least one embodiment, the base 1612 may connect across the top of the tool 1610 (optionally with one or more channels or bores therein). In other embodiments, the base 1612 may be a monolithic block. In some embodiments, the base 1612 may include an inner surface 1646 that optionally includes a mechanical connection surface 1624, such as box threads. Other examples include a mechanical connection surface 1624 configured to use a fastener. Other embodiments include an inner surface 1646 that is smooth. In some embodiments, the mechanical connection surface 1624 may be machined in after manufacturing of the base 1612 through an additive manufacturing process is complete, as described in relation to FIG. 18.

In some embodiments, the base 1612 may include radial walls 1647 and a bridge 1649 manufactured to span the area between the radial walls 1647. The bridge 1649 may be manufactured by filling the area between the radial walls 1647 with sand, wax or other easily removed filler material. The first material 1616 may then be applied and sintered on top of the filler material and the radial walls 1647 to create the bridge 1649.

Figure 17:
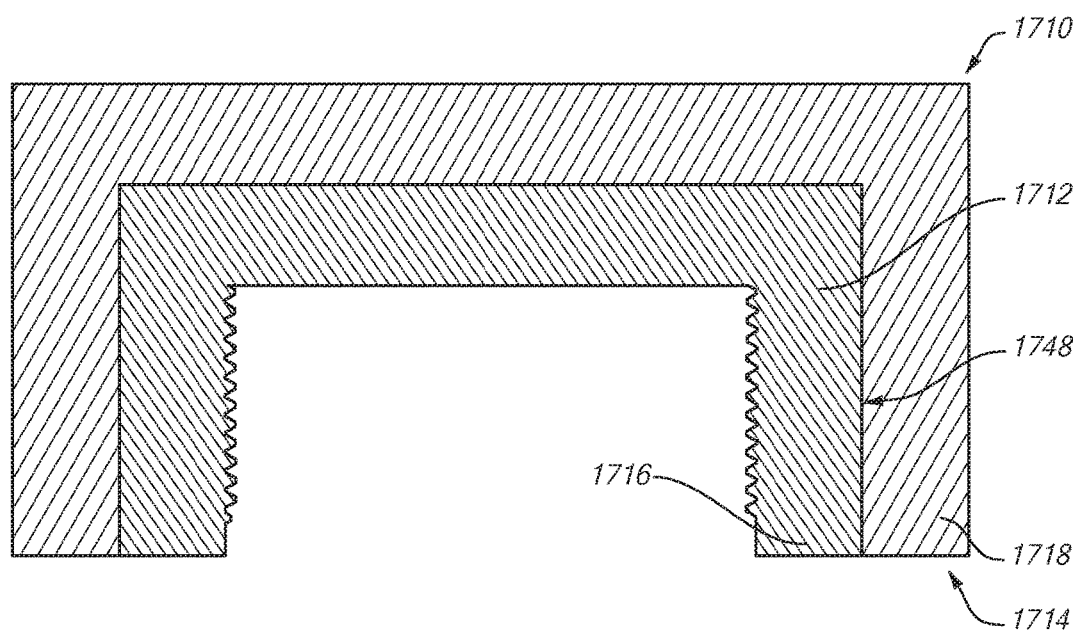
FIG. 17 is a schematic side cross-sectional view of a partially completed tool with a completed base, according to embodiments of the present disclosure.

FIG. 17 is a schematic diagram of a partially completed tool 1710, in which the base 1712 has been completed, according to an embodiment of the present disclosure. In some embodiments, additional layers to complete the crown 1714 may be made entirely of the second material 1718, or different materials may be used (e.g., different materials that are all different from the first material forming all or a portion of the base 1712). In some embodiments, the base 1712 may be completely radially internal to the crown 1714. For example, the radially exterior surface 1748 of the base 1712 may contact the crown 1714 or have a maximum radial position less than a maximum radial position of the crown 1714. In other embodiments, at least a portion of the exterior surface 1748 of the base 1712 may not contact the crown 1714. For example, the bottom of the base 1712 may extend past the crown 1714 in a downward direction in the orientation shown in FIG. 17.

Figure 18:
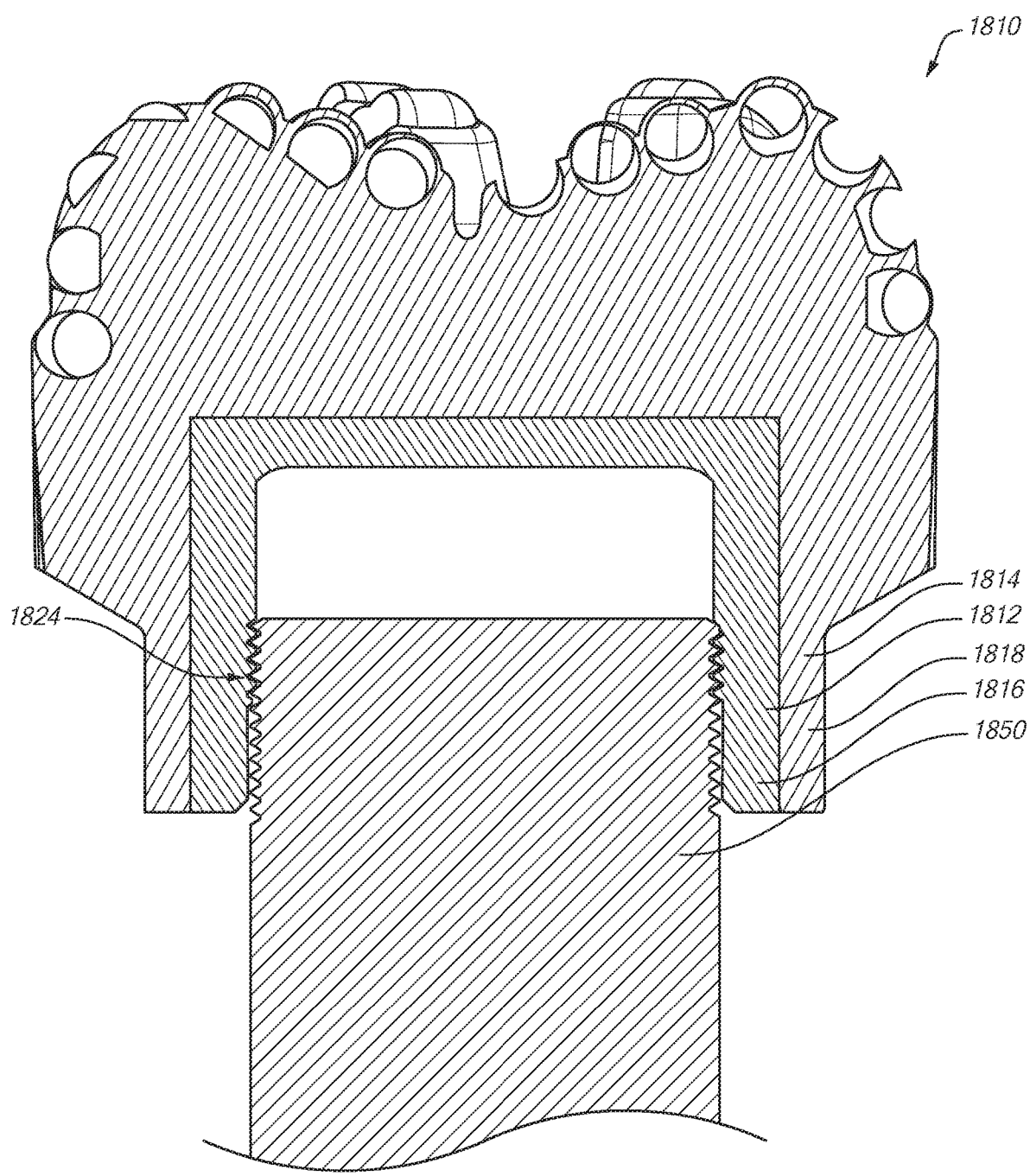
FIG. 18 is a schematic side cross-sectional view of a base with a completed crown encompassing the base, the base including a mechanical connection surface, according to embodiments of the present disclosure.

Referring to FIG. 18, a completed tool 1810 may include a base 1812, at least partially internal to a crown 1814, according to an embodiment of the present disclosure. In some embodiments, the base 1812 may be machined after manufacturing to create a mechanical connection surface 1824 internal to the base 1812 and the crown 1814. Machining of the base 1812 after it is completed may be performed using one of many well-known procedures in the art. For example, the base 1812 may be machined using a tap 1850 to create a box-threaded mechanical connection surface 1824. In other embodiments, the base 1812 may be manufactured with a mechanical connection surface 1824 that is included in the base 1812 during manufacturing.

Repeated application and sintering in succeeding layers may create a completed tool 1810. Additive manufacturing of the crown 1814 supports complex geometries that would otherwise be impractical or not cost-effective using other manufacturing techniques. As discussed herein with respect to layering of materials of a crown, successive layers may be deposited, applied, and sintered using a similar technique or material as the layer beneath, or using different techniques or materials.

Figure 19:
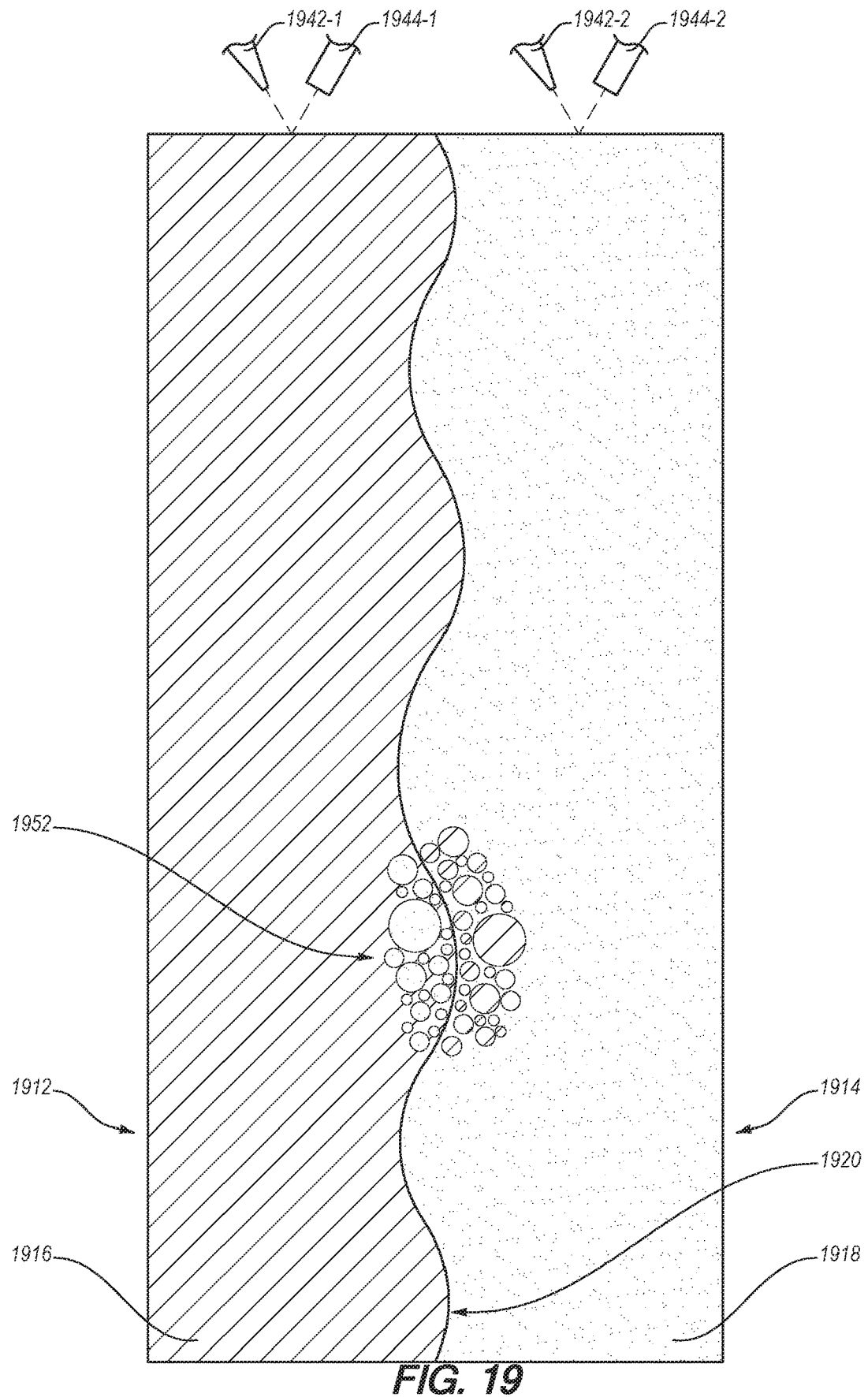
FIG. 19 is a schematic cross-sectional view of a contact surface between a base and a crown, according embodiments of to the present disclosure.

FIG. 19 is a cross-sectional, schematic view of an interface or contact 1920 between a first material 1916 and a second material 1918, according to an embodiment of the present disclosure. In some embodiments, sintering the first material 1916 simultaneously with the second material 1918 at or near the contact 1920 may create a bond between the crown 1914 and the base 1912. The bond between the crown 1914 and the base 1912 may help to prevent the crown 1914 and the base 1912 from becoming disconnected. In some embodiments, the bond is created from the contact roughness of the contact 1920 between the crown 1914 and the base 1912. For example, the applicators 1942-1 and 1942-2 may apply the first material 1916 and the second material 1918, respectively, and the sintering devices 1944-1 and 1944-2 may sinter the first material 1916 and the second material 1918, respectively. Each applicator 1942-1, 1942-2 may have a deposition precision and/or resolution, and the relative variation in the size of applied materials may also affect the precision and/or resolution. A greater precision and/or resolution may decrease the contact roughness of the contact 1920, while a lower precision and/or resolution may increase the contact roughness of the contact 1920. A greater contact roughness may strengthen the bond, while a lower roughness may weaken the bond, in some embodiments.

In some embodiments, the first material 1916 may have a first thermal expansion rate. The second material 1918 may have a second thermal expansion rate. A ratio between the first thermal expansion rate and the second thermal expansion rate may be such that when the first material 1916 is internal to the second material 1918, the first material 1916 may be placed in compression by the second material 1918. Placing the first material 1916 in compression by the second material 1918 may strengthen the bond at the contact 1920. For example, the second material 1918 may have a higher thermal expansion rate than the first material 1916, and the first and second material 1916, 1918 may be manufactured at a temperature greater than 25° C. The temperature of the first material 1916 and the second material 1918 may then be lowered to 25° C., and the second material 1918 may contract more than the first material 1916, thereby placing the first material 1916 in compression.

In some embodiments, sintering the first material 1916 and the second material 1918 may create a sintered bond between the first material 1916 and the second material 1918 with movement and/or migration of at least a portion of the first material 1916 migrating into the second material 1918 and vice versa. For example, sintering the first material 1916 simultaneously with the second material 1918 may allow for impregnation and/or dissolution of a portion 1952 of the second material 1918 within the first material 1916. In other examples, sintering the first material 1916 and the second material 1918 (e.g., simultaneously) may allow for impregnation and/or dissolution of a portion of the second material 1918 within the first material 1916.

Figure 20:
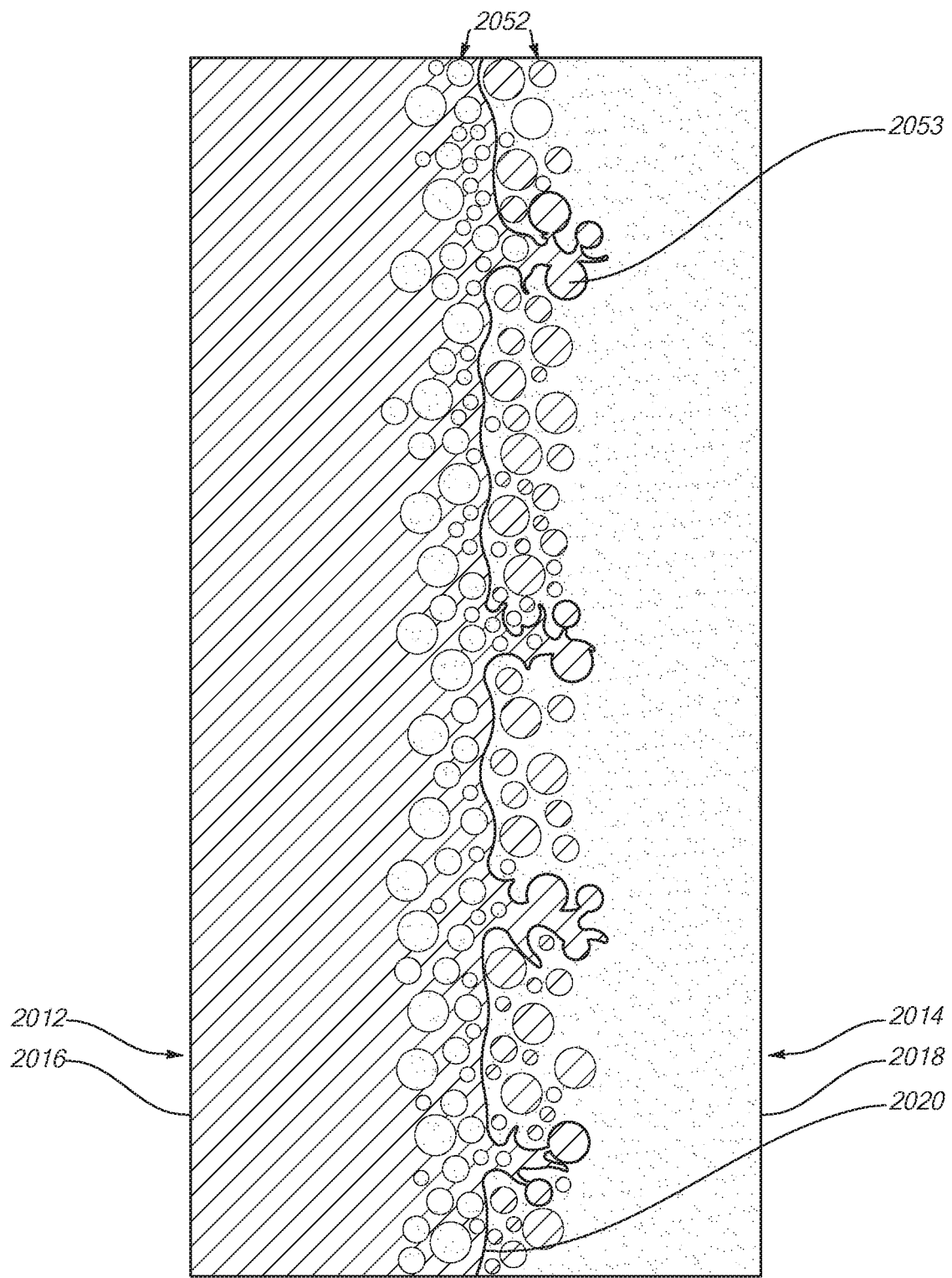
FIG. 20 is a schematic cross-sectional view of a contact surface between a base and a crown, illustrating the impregnation of materials at the contact, according to additional embodiments of the present disclosure.

FIG. 20 represents a schematic, detail view of another embodiment of a contact 2020 between a first material 2016 and a second material 2018, according to an embodiment of the present disclosure. In some embodiments, the contact 2020 may include impregnations 2052 of the first material 2016 in the second material 2018 and/or impregnations of the second material 2018 into the first material 2016. In some embodiments, the impregnation may include a portion of the first material 2016 migrated across the boundary of the contact 2020 into the second material 2018, and forming a matrix 2053 around discrete portions of the second material 2018. In other embodiments, the impregnation 2052 may include a portion of the second material 2018 jutting into the first material 2016, with the portion of the second material 2018 still connected to the monolithic body of the second material 2018. Still other embodiments may include a portion of the first material 2016 mixing with the second material 2018, a gradient of the first material 2016 formed in the second material 2018, or secondary phases forming, such as with incongruent dissolution at the contact 2020. An increased depth or occurrence of impregnation and/or dissolution may strengthen the bond between the first material 2016 and the second material 2018. In some embodiments, the depth of impregnation may be less than 0.5 mm. In other embodiments, the depth of impregnation may be in a range having a lower value, an upper value, or lower and upper values including any of 0 mm, 0.05 mm, 0.1 mm, 0.2 mm, 0.4 mm, 0.6 mm, 0.8 mm, 1 mm, 2 mm, or any value therebetween. For example, the depth of impregnation may be greater than 0 mm or greater than 0.05 mm. In other examples, the depth of impregnation may be less than 1 mm. Still other examples include a depth of impregnation in a range between 0 mm and 1 mm, 0.05 mm and 0.75 mm, or 0.1 mm and 0.5 mm.

Figure 23:
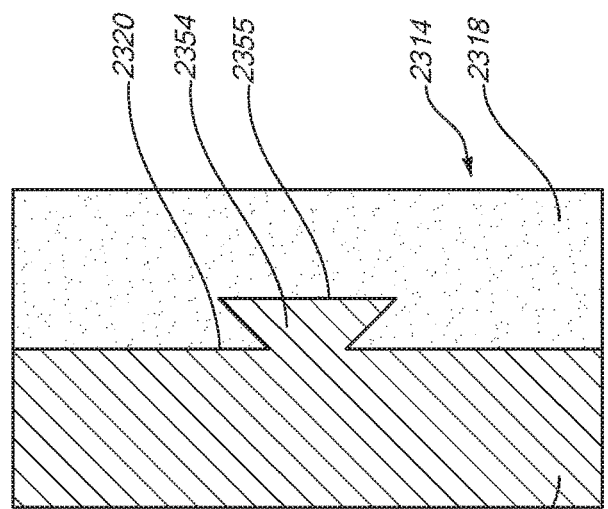
FIGS. 21-23 are schematic cross-sectional views a contact surface between a base and a crown, according to embodiments of the present disclosure.
Figure 22:
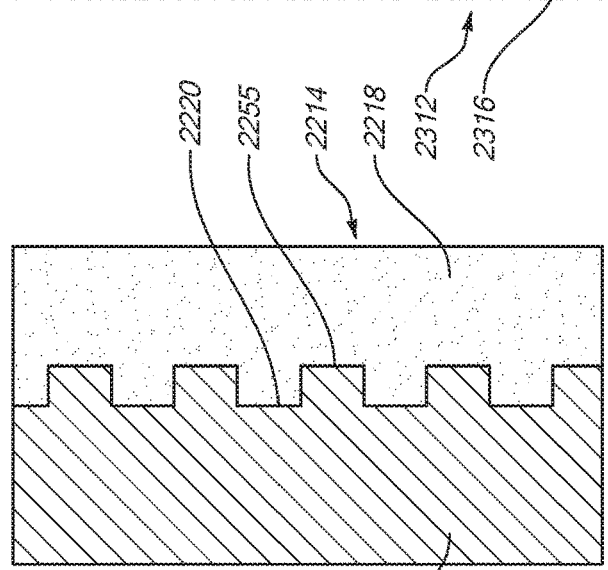
Figure 21:
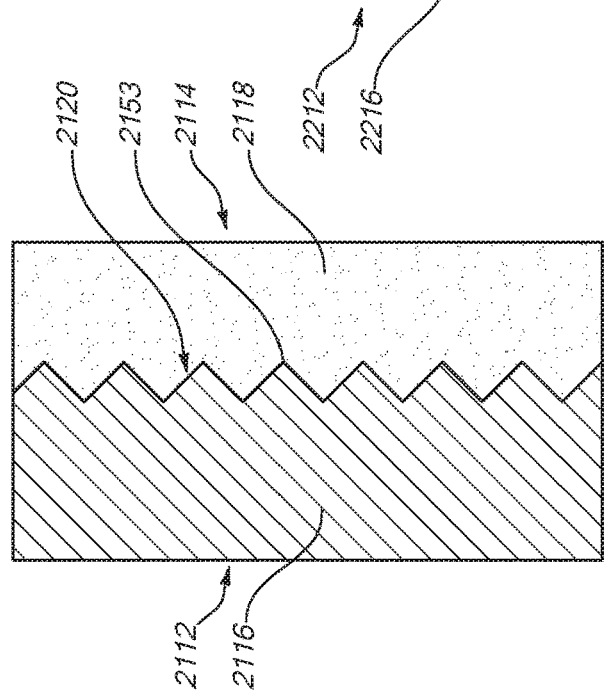

In some embodiments, an interface or contact may be substantially linear or planar at a macro level, with surface roughness viewed on a micro level. As shown in FIGS. 21-23, in other embodiments, the contact may not be linear or planar even at the macro level. A non-planar and/or non-linear contact may provide additional surface area over which a bond may form during additive manufacturing of the tool. For example, as shown in FIG. 21, the contact 2120 may include at least one ridge 2153, and the base 2112 and crown 2114 have complimentarily shaped ridges and troughs. Other examples may include a plurality of ridges 2153, including 2, 3, 4, 5, 6, 7, 8, or more ridges 2153. In some embodiments, the ridges 2153 may traverse at least partially around a circumference of the base 2112 and the crown 2114 (e.g., rings around an outer surface of the base 2112), mechanically interlocking the base and crown under tension in the longitudinal direction. In other embodiments, the ridges 2153 may run longitudinally to the base 2112 and the crown 2114 for at least part of the longitudinal length of the crown 2114 (e.g. splines along the longitudinal direction of an outer surface of the base 2112), mechanically interlocking the base and crown under the application of torque in the rotational direction. Other examples include at least one conical, pyramidal, cuboid, or other shaped protrusion extending into either the first material 2116 or the second material 2118 (or from the first or second material 2116, 2118 into the base 2112).

Referring to FIG. 22, in some embodiments, an interface or contact 2220 may include at least one flat topped ridge 2255, wherein each of the base 2212 and crown 2214 have complimentarily shaped ridges/troughs. Some embodiments may include a plurality of flat topped ridges 2255, including 2, 3, 4, 5, 6, 7, 8, or more flat topped ridges 2255. In some embodiments, the flat topped ridges 2255 may traverse at least partially around the circumference of the base 2212 and the crown 2214. In other embodiments, the flat topped ridges 2255 may run longitudinally to the base 2212 and the crown 2214 at least partially along the longitudinal length of the crown 2214.

Referring to FIG. 23, in some embodiments, an interface or contact 2320 may include at least one protrusion 2354 protruding from the base 2312 with a complimentarily shaped recess 2355 in the crown 2314 configured to receive the protrusion 2354. In other embodiments, the protrusion 2354 may protrude from the crown 2314. In some embodiments, the protrusion 2354 may include at least a portion that overhangs the contact 2320. For example, a protrusion 2354 and complimentary recess 2355 that are manufactured by an additive manufacturing process may include an inverted cone or pyramid (e.g., a rotationally symmetrical dovetail). Other examples include an "L" or a "T" shaped protrusion, with the bar of the "L" or "T" overhanging the contact 2320. A protrusion 2354 that includes at least one overhanging portion may strengthen the contact 2320 between the first material 2316 and the second material 2318 in one or both of rotation and tension. Other examples include at least one cuboid protrusion protruding into either the first material 2316 or the second material 2318. Including one or more surface features along the contact 2320 may strengthen the mechanical interlock between the first material 2316 and the second material 2318 and/or increase surface area of the contact 2320, allowing for a strengthened sintered bond between the first material 2316 and the second material 2318.

In at least some embodiments of tools according to the present disclosure, additive manufacturing may allow a crown including a higher wear-resistant material to be built upon a base of higher toughness, less brittle material. In at least one embodiment, tungsten carbide may be fixed to a steel base to provide a wear-resistant crown on a machinable base that may be mated to other components. A boundary between the crown and the base may be reinforced with one or more mechanical interlocks to transmit torque without fracturing the tool at the boundary of the crown and base. In at least some embodiments, a cutting tool manufactured according to the presently described method may provide an integral bond between a machinable base and a wear-resistant crown. Such methods may allow for more efficient printing of a cutting tool that is easily mated to existing drill strings and/or downhole tools while employing wear-resistant materials such as tungsten carbide in contact with rock or other materials to be cut. Co-printing of a plurality of disparate materials during additive manufacturing may allow cutting tools with more complex geometries to be created while maintaining compatibility with existing systems.

As used herein, the terms connect, connection, connected, in connection with, and connecting may be used to mean in direct connection with or in connection with via one or more elements. Similarly, the terms couple, attach, secure, and variations thereof, may be used to mean directly coupled, secured, or attached together or coupled, secured, or attached together via one or more elements. Terms such as up, down, top and bottom and other like terms indicating relative positions to a given point or element may be utilized to more clearly describe some elements. Commonly, these terms relate to a reference point such as the surface from which drilling operations are initiated.

Features not described as essential are optional, and the terms "may" or "can" expressly indicate that a certain feature is present in an embodiment, but may be excluded in other embodiments. The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value. Where ranges are described in combination with a set of potential lower or upper values, each value may be used in an open-ended range (e.g., at least 50%, up to 50%), as a single value, or two values may be combined to define a range (e.g., between 50% and 75%).

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A cutting tool, comprising:
a base having a base surface top and at least one torque transfer feature extending from the base surface top, the at least one torque transfer feature being integrally formed with the base surface top, the at least one torque transfer feature including a plurality of protrusions protruding in a longitudinal direction from the base surface top, the base including a first material; and
a crown bonded to the base surface top of the base, the crown including a cutting structure and a second material having a higher hardness than the first material, at least a portion of the crown contacting the base surface top and the at least one torque transfer feature, the at least one torque transfer feature being configured to transfer torque from the base to the crown, the crown including a recess receiving a protrusion of the at least one torque transfer feature, the recess and the protrusion mechanically interlocking the base and the crown in a rotational direction, the crown being formed of a plurality of layers of the second material, and the plurality of layers also forming the recess.

2. The cutting tool of claim 1, the first material being steel and the second material being tungsten carbide.

3. The cutting tool of claim 1, the crown fully encompassing a height and width of the at least one torque transfer feature.

4. The cutting tool of claim 1, the base being connected to the crown using a mechanical connection.

5. The cutting tool of claim 1, the base being connected to the crown using one or more fasteners.

6. A method for manufacturing a cutting tool, comprising:
providing a base including a first material, the base having a base surface top and a rotational axis about normal to at least a portion of the base surface top, the base further including at least one protrusion extending in a longitudinal direction from the base surface top, wherein the at least one protrusion includes a side surface transverse to the base surface top, and wherein at least a portion of the side surface is continuous with at least a portion of the base surface top;
applying a first layer of a plurality of layers of a second material directly to the base surface top, the second material having a higher hardness than the first material, at least part of the second material being adjacent the at least one protrusion;
bonding the first layer of the second material while on the base surface top; and
applying a second layer of the second material to the first layer of the second material, the second layer and the first layer defining at least a portion of a recess at least partially surrounding the at least one protrusion.

7. The method of claim 6, wherein bonding the first layer of the second material comprises sintering the first layer of the second material to the first material of the base surface top.

8. The method of claim 7, wherein sintering the second material includes laser sintering or electron beam sintering.

9. The method of claim 6, wherein the at least one protrusion is not constructed separately and later attached to the base.

10. A cutting tool, comprising:
a base including an upper base normal to a longitudinal axis of the cutting tool, wherein at least one torque transfer feature protrudes from a base surface, wherein the at least one torque transfer feature includes a curved connection between the base surface and a wall of the at least one torque transfer feature, wherein the at least one torque transfer feature includes a chamfered connection between the wall and a top surface of the at least one torque transfer feature, wherein the base includes a first material; and
a crown bonded to the base surface of the base, the crown including a cutting structure and a second material having a higher hardness than the first material, the crown being formed of a plurality of layers of the second material, at least a portion of the crown contacting the base surface and the at least one torque transfer feature, the plurality of layers forming a recess receiving the at least one torque transfer feature, the at least one torque transfer feature being configured to transfer torque from the base to the crown.

11. The cutting tool of claim 10, wherein the at least one torque transfer feature has a cuboid shape.

* * * * *